United States Patent [19]
Ichimura et al.

[11] Patent Number: 6,023,653
[45] Date of Patent: Feb. 8, 2000

[54] VEHICLE POSITION DETECTING APPARATUS

[75] Inventors: Atsushi Ichimura; Masatsugu Kamimura; Jyunichi Yamamoto, all of Kobe, Japan

[73] Assignee: Fujitsu Ten Limited, Hyogo, Japan

[21] Appl. No.: 08/757,451

[22] Filed: Nov. 27, 1996

[30] Foreign Application Priority Data

| | | | |
|---|---|---|---|
| Nov. 30, 1995 | [JP] | Japan | 7-312224 |
| Dec. 1, 1995 | [JP] | Japan | 7-314495 |
| Dec. 1, 1995 | [JP] | Japan | 7-314529 |

[51] Int. Cl.⁷ .................................... G06F 165/00
[52] U.S. Cl. .................... 701/208; 701/201; 701/205; 701/207; 701/209; 701/210
[58] Field of Search .................... 701/207, 201, 701/208, 202, 209, 205, 214, 212, 217; 340/990, 995; 344/988

[56] References Cited

U.S. PATENT DOCUMENTS

| | | | |
|---|---|---|---|
| 5,159,556 | 10/1992 | Schorter | 364/449 |
| 5,359,529 | 10/1994 | Snider | 364/449 |
| 5,383,128 | 1/1995 | Nishida et al. | 364/449 |
| 5,742,923 | 4/1998 | Odagawa | 701/207 |
| 5,752,207 | 5/1998 | Sarangapani | 701/26 |
| 5,774,073 | 6/1998 | Maekawa et al. | 340/995 |
| 5,774,824 | 6/1998 | Streit et al. | 701/207 |
| 5,774,827 | 6/1998 | Smith, Jr. et al. | 701/209 |
| 5,793,631 | 8/1998 | Ito et al. | 364/449 |

FOREIGN PATENT DOCUMENTS

| | | |
|---|---|---|
| 63-168508 | 7/1988 | Japan . |
| 64-41997 | 2/1989 | Japan . |
| 1-276015 | 11/1989 | Japan . |
| 3-200008 | 9/1991 | Japan . |
| 3-265887 | 11/1991 | Japan . |
| 6-129868 | 5/1994 | Japan . |
| 8-29189 | 2/1996 | Japan . |
| 8-54246 | 2/1996 | Japan . |
| 8-61971 | 3/1996 | Japan . |

*Primary Examiner*—William A. Cuchlinski, Jr.
*Assistant Examiner*—Arthur D. Donnelly
*Attorney, Agent, or Firm*—Wenderoth, Lind & Ponack, L.L.P.

[57] ABSTRACT

The navigation apparatus gives, to a map match processing portion, the measured present location and progress bearing of the vehicle with the use of the position bearing measuring portion for each predetermined period. The map match processing portion reads out the road data about the road close to the measured present position from the memory apparatus to effect the map match processing with respect to each link in accordance with the road data for correcting the measured present position. The correcting operation is effected only when the frequency, where the similarity degree with respect to the measured present position and progress bearing at this time is judged to be larger than the predetermined threshold value, is larger than the predetermined constant Ck. The road data are visually displayed on the visual displaying region of the displaying apparatus. The predetermined diagrams are displayed in a superimposed manner, in the corrected present position, on the road data visually displayed.

8 Claims, 11 Drawing Sheets

VEHICLE POSITION DETECTING APPARATUS

BACKGROUND OF THE INVENTION

1. Field of the Invention

The present invention relates to a vehicle position detecting apparatus which is used in a map matching apparatus of a navigation apparatus to be mounted on a vehicle.

2. Description of the Related Art

A navigation apparatus calculates routes traveled by a mobile body, such as automobile or the like, and displays the present position, where the vehicle is running, on a map scene which is displayed on a displaying apparatus, thus assisting drivers. The present position of the vehicle is measured by, for example, a GPS (Global Positioning System). Also, the present position may be obtained with the use of the running distance of the vehicle which is measured in accordance with an output from the vehicle speed sensor and a relative bearing of the vehicle which is measured by a gyrocompass. The bearing indicates a direction along a direction in which the vehicle progresses at the time the vehicle has passed the present position.

The present position of the vehicle, obtained in this manner, is often deviated from the present position of the actual vehicle. The measuring error becomes larger as the position of each positioning satellite becomes closer. Apparently, this is due to the fact that the GPS effects triangular surveying with the use of a plurality of positioning satellites. Also, the measuring errors become larger even when the number of the positioning satellites which are used in the measuring is small. The measuring errors are caused because of slipping, or the like, of wheels since the running distance is obtained from the revolution number of the wheels during the measuring of the running distance with the use of the vehicle speed sensor. Also, the gyrocompass causes errors in the bearing measured since the gyrocompass changes, as time passes, due to temperature changes in characteristics of offset, or the like, of output signals.

Also, in an apparatus for measuring the present position of the vehicle with the gyrocompass and the vehicle speed sensor combined, the present position is successively estimated as a position which is reached by the vehicle after running only the newest running distance in the newest bearing measured from the present position in the past. Therefore, the present positions measured subsequently are also deviated successively when the present position in the past is deviated from the actual present position by correction.

In this manner, measured errors are included in the measured present position of the vehicle. Therefore, the navigation apparatus, provided with a map matching apparatus, effects a match processing operation for correcting the present position of the vehicle. The navigation apparatus visually displays the present position on the map scene to effect navigation. The prior art concerning the pattern matching is disclosed in, for example, Japanese Unexamined Patent Publication JP-A 64-41997 (1989).

In the match processing, the running tracks of the vehicle, which is the shape of the running route, is compared with the road shape to correct the present position of the vehicle on the road when the running tracks are similar to the road shape. Namely, assume that the vehicle is running on the road shown on the map scene to correct the position of the vehicle. A plurality of roads sometimes exist near the measured present position in the match processing. At this time, the matching apparatus divides roads into portions called links which are a plurality of linear road portions with corners, intersection points, and both ends, etc., and obtains the similarity degree with respect to each road portion to set the correction portion of the present position on the road portion having the largest degree of similarity. The similarity degree is obtained, based on a difference in bearing between the road of the links and the vehicle, and the distance between the link and the measured present position of the vehicle. The similarity degree becomes larger as the difference in bearing becomes smaller. The similarity degree becomes larger as the distance is shorter.

The running distance of the vehicle from the intersection point approaching position to the intersection point passing position is different in accordance with the positions in the width direction of the road at the approaching and passing time when the vehicle turns to the right and to the left at the intersection point. The data of the road of the map scene are simplified and displayed only as segments showing the length of the road and the direction capable of running. Therefore, it is difficult to calculate the deviation of the running distance from the road data. Also, the grade of the road is not taken into consideration because the map scene is displayed as a plan view seen from the sky. The grade may be different and the length of the actual road may be different when two roads are represented as roads of the same length on the map scene. Further, curved roads may be deformed in digital data. Mountain roads especially become larger in precision error due to a simplification of the road data of the map scene because the road grades are large and there are many curves. The gap of the present position may be sometimes larger conversely when the map match processing is effected in accordance with such map scenes.

Also, in order to reduce the data amount, in the road data of the navigation apparatus roads which have a small amount of traffic and have a smaller use possibility are not included with such trunk roads recorded as data such as those having a heavy in traffic amount in expressways, national roads or the like. In the roads older in the date, the roads newly opened may be not recorded as road.

The map match processing is sometimes effected in accordance with road data having unknown roads not recorded as described above. The navigation apparatus does not correct the present position when the similarity degree calculated with respect to the links are smaller than the predetermined values. Namely, the dead reckoning navigation is used in the navigation without correcting the measured present position, as it is, when the present position of the vehicle and the road are largely separated.

The measured present position, when the vehicle is running on the unknown road, is considered to be separated from any of the many roads recorded. In such a case, the navigation apparatus carries out the dead reckoning navigation, but does not correct the present position. The unknown roads are connected with recorded roads at intersection points. Also, one portion thereof sometimes approaches to the recorded road even when the road is not connected with the recorded road. When the unknown road approaches to the road recorded, the present position of the vehicle existing on the unknown road approaches to the recorded road to increase the similarity degree. At this time, the navigation apparatus of the conventional art corrects the present position onto the recorded road despite the vehicle running on the unknown road. Thus, the navigation apparatus of the conventional art corrects the present position so that the vehicle is deviated from the actual present position and progress bearing conversely to increase errors.

Japanese Unexamined Patent Publication JP-A 3-265887 (1991) discloses the art of processing the map match processing with respect to the road on which the actual vehicle is running when the road is branched at a shallow angle at an intersection point. The navigation apparatus of the present publication sets correcting candidate points to be corrected in the position of the vehicle respectively on two roads branched when the road is branched to calculate evaluation values with respect to the respective correcting candidate points. The evaluation values are determined from the present position of the vehicle and the agreement degree between the progress bearing and the road direction. The evaluation with respect to each road is continued from the production of the correcting candidate points at the intersection point to the continuous reduction where the evaluation value with respect to the correcting candidate points becomes equal to or less than a predetermined value. Therefore, the evaluation is effected in parallel with respect to a plurality of roads.

Also, the match processing using the similarity degree sometimes sets the corrected present position onto the road different from the road on which the vehicle is actually running when the difference between the road shape and the running track is large. The running track is sometimes corrected, as if the vehicle makes a U-turn from halfway in the corner to run reversibly in spite of the vehicle running to pass the corner when the difference of the road shape and the running track are large, when the vehicle is running the corner which is bent like the hairpin shape.

FIG. 17A is a diagram showing a running track 2 measured when the vehicle runs on a road 1. The road 1 has a road shape curved into a hairpin bend with links 4 through 7 sequentially connected. The vehicle runs as if it sequentially passes the links 4 through 7 on the road 1. The running track 2 measured at this time is formed by sequentially connecting the present position of the vehicle measured for every predetermined period, and a track portion 9 through 13 which is obtained from the progress bearing measured in the present position.

At this time, a connecting point 15 between the track portions 10 and 11 as one of the measured present positions of the vehicle exists at an almost equal distance to the links 4, 7. In the difference in bearing between the track portion 11 directed at a bearing equal to the progress bearing at the connecting point 15, the difference in bearing with respect to the link 4 is smaller than the difference in bearing with respect to the link 7. Therefore, the similarity degree of the link 4 is smaller as compared with the similarity degree with respect to the link 7. At this time, the matching apparatus corrects the present position corresponding to the connecting point 15, judging that the vehicle is running on the link 4, to shift-move the tracking portions 11 through 13. A connecting point 15a, and tracking portions 11a through 13a of FIG. 17B show the track portions after the correction thereof. A running track 2a, after the correction thereof shown in FIG. 17B, shows such movement as U-turning halfway the corner of the road 1 to run reversibly.

By correcting the present position of the vehicle, match-processing with only the similarity degree with respect to the link as a judging reference in this manner, and the deviation between the actual present position and the present position the navigation apparatus recognizes becomes larger when the road shape is bent like a hairpin bend having a large difference between the road shape and the running track.

The road data are simplified and displayed as segments showing only the length of the roads and the directions capable of running. Although the running distance of the vehicle from the approaching position of the intersection point to the passing position of the intersection point is different in accordance with the positions in the width direction of the road at approaching and passing time when the vehicle turns to left and to right at the intersection point, it is difficult to calculate the difference of the running distance from the road data. Also, the grade of the road is not taken into consideration, because the map scene are displayed as a plan view seen from the sky. Therefore, even if a road is the same as another road in length on the map scene, the roads may be different in actual length because of different grades. Mountain roads especially become larger in the precision errors due to the simplification, because the road data are often simplified due to an extensive number of the links. Effect a map match processing operation based on the road data, and the deviation of the present position sometimes becomes larger conversely.

The navigation apparatus effects its navigation with the corrected present vehicle positions being displayed on the map scene. The actual present position of the vehicle is different from the present position displayed when the running track is U-turned to run reversibly by the match processing although the vehicle is not actually U-turned, as described above. Therefore, different feelings are given to the user of the navigation apparatus such as, for example, a driver of the vehicle. Also, an apparatus for measuring the present position of the vehicle with the gyrocompass and the vehicle speed sensor combined estimates of the present position successively as the position where the vehicle has run only by the newest running distance towards the newest progress bearing measured from the past present position. Therefore, when the present position in the past is deviated from the actual present position by correction, as a consequence, the present positions to be measured subsequently are also sequentially deviated.

Japanese Unexamined Patent Publication JP-A 1-276015 (1989) discloses a navigation apparatus for vehicle mounting use for estimating and displaying the present position of the vehicle and correcting them by match processing. The navigation apparatus of this prior art obtains the present positions of the vehicle from the progress bearing measured with geomagnetism sensors and the running distance measured with distance sensors. Nodes only are selected, with nodes being on the downstream side of the progress bearing of the vehicle seen from the present position, from among the nodes which are points on the road existing on the predetermined distance from the present position. These selected nodes on the downstream side of the progress bearing are match-processed as the objects of the correction position of the present position.

As described above, the similarity degree is obtained on the basis of the difference in bearing between the link and the vehicle, and the distance between the road and the measured present position of the vehicle. The similarity degree becomes larger as the difference in bearing is smaller. The similarity degree becomes larger as the distance is shorter. Suppose that the vehicle runs in the order of links A1, A2, A3 on a road 21 which is a Y-shaped road branched in such a shallow angle as shown in FIG. 18A. The difference in road bearing between the links A2 and A4 immediately after the branching is small. FIG. 18B is a graph showing time changes in accumulation similarity degree which is the accumulation adding result of the similarity degree with respect to the links A2, A3 and links A4, A5 in the running on the road 21 after branching. A linear line 23 shows time changes in the accumulation similarity degree with respect to the links A2, A3. A linear line 24 shows time changes in accumulation similarity degree with respect to the links A4, A5.

At a time t1 immediately after the vehicle has passed a branch point p, the present position is measured to correct on the road 1 the present position measured. Assume that the present position is corrected respectively into correction points pa1, pb1. The vehicle sometimes becomes larger in similarity degree with respect to the link A4 than in similarity degree with respect to the link A2, in spite of the vehicle running on the link A2, by the measured errors of the present position.

The present position is measured at times t2, t3, t4 continuously. Suppose that the vehicle runs at each link A2, A3, A4, A5 respectively, and similarity degrees are calculated and added accumulatively in parallel. The present position is corrected respectively into corrected points pa2, pb2: pa3, pb3 at times t2, t3 and the accumulation similarity degree is added at almost the same time. A corrected point pb4 is removed from the links A4, A5 so that similarity degree becomes extremely small, because the vehicle actually runs on the links A2, A3 at times t2, t3. The similarity degree with respect to the link A3 has the same degree in size as that obtained at the time t3. Thus, the accumulation similarity degree is reversed in size. It is judged that a possibility of the vehicle running is higher in the links A2, A3 than in the links A4, A5. A link on which the vehicle is running is likely to be taken in a wrong way on a road branched at a shallow angle due to the judgment that the vehicle is running in accordance with the separation degree only immediately after the branching as described above.

Such a navigation apparatus as described above cannot evaluate with respect to unknown roads although the evaluation can be effected on roads which the navigation apparatus itself records. Therefore, it is difficult to evaluate unknown roads and recorded roads in parallel when the vehicle is running on the unknown road. It is difficult to prevent the errors from being increased.

Also, such a navigation apparatus as described above can prevent movements such as U-turning into a reverse running in running track with match processing when the vehicle is running only in a one way direction. The present position cannot be corrected into nodes of the road the vehicle reverses to when the vehicle makes a U-turn and reverses, because the apparatus does not add into the correction object of the present position the nodes on the upstream side of the progress bearing of the vehicle.

Further, such a navigation apparatus as described above can reduce the errors on the branched road. Namely, the errors of the present position in a direction orthogonal to the running direction of the vehicle are corrected. The navigation apparatus effects parallel evaluations with respect to the road only when the road has been branched to reduce the errors of the evaluation value. Therefore, it is difficult to reduce the errors, because the frequency of effecting parallel evaluations is sharply reduced on the roads containing fewer branching such as expressways and so on.

Also, the present position measured by the navigation apparatus makes errors not only in a direction parallel to the running direction of the vehicle, but also in a direction along the running direction of the vehicle. The errors are caused when the running distance measured in the slipping of the vehicle has been deviated as the actual running distance in, for example, the measuring of the present position of the vehicle. Such errors are often caused on gravel roads, snow-covered roads, and so on, where wheels are likely to slip. The present position asked for is set, and deviated in the longitudinal direction along the progress direction of the vehicle from the actual present position in the deviation between the measured running distance and the actual running distance when the present position is obtained in accordance with the running distance and the turning amount.

Also, the errors described above are caused due to simplification into data in the road data which are used in the match processing. To reduce the data amount to be recorded in the navigation apparatus, the roads are simplified and displayed with the length of the road and the direction capable of running as segments. When the vehicle turns to the right or to the left in the crossing point, the running distance of the vehicle from the intersection point approaching position to the intersection point passing position is different by the running track of the vehicle from the intersection point approaching time to the passing time. Especially on the wider roads, the difference results in the manner of passing the positions in the width direction of the road at the intersection point approaching time and passing time.

When the present position is obtained on the basis of the running distance and the turning amount, the obtained present position is deviated in the longitudinal direction from the actual present position when the running distance obtained from the above described road data is deviated from the actual running distance in the present position obtained in accordance with the running distance and the turning amount. It is difficult to obtain such running distance deviation from the simplified road data.

Also, the road data are displayed as a plan view seen from the sky and are simplified in small grade and turning of the road. Accordingly, the length of the actual road may be different from the length of the road in terms of the road data. The precision errors of the road data becomes larger, because the road grades are larger on mountain roads. The running distance to run in terms of the road data is different from the actual running distance measured, thus causing the deviation of the present position determined in terms of the road data.

SUMMARY OF THE INVENTION

An object of the present invention is to provide a vehicle position detecting apparatus capable of preventing errors of a present position of a vehicle from increasing when the vehicle is running on an unknown road.

Another object of the invention is to provide a vehicle position detecting apparatus capable of precisely correcting a present measurement position of a vehicle in accordance with the behavior of the vehicle.

Still another object of the invention is to provide a vehicle position detecting apparatus capable of correcting an error of a present position of a vehicle regardless of the existence of branching points of roads such as intersection points and so on.

The invention provides a vehicle position detecting apparatus comprising:
  road data recording means for recording road data composed of a plurality of linear road portions;
  reading means for reading out the road data from the road data recording means;
  present position detecting means for detecting a present position of a vehicle;
  vehicle bearing detecting means for detecting a progress bearing corresponding to a progress direction of the vehicle at the present position; and map matching means for responding to outputs of the reading means, the present position detecting means, and the vehicle bearing detecting means and correcting the present position of the vehicle on the road portions of the road data;

wherein the map matching means includes:

similarity degree calculating means for retrieving a road portion close to the present position detected from the recorded road data and calculating a similarity degree between a road bearing for each retrieved road portion and a running history of the vehicle on the basis of the present position and progress direction of the vehicle; and position correcting means for responding to an output of the similarity degree calculating means and correcting the present position of the vehicle on the retrieved road portion when the similarity degree with respect to a single road portion is larger than a predetermined value continuously for at least a predetermined section.

According to the invention, the vehicle position detecting apparatus detects the present position of the vehicle, and corrects the present position in accordance with a plurality of road portions and the running history of the vehicle so as to obtain the final present position. The running history shows the movement amount and the moving direction of the vehicle in accordance with the present position and the progress direction of the vehicle with the shape thereof becoming running tracks.

The present position of the vehicle is detected by a present position detecting means such as GPS and so on. The present position detected with the GPS is represented by an absolute position which is represented with latitude and longitude. The detected position detected with the GPS includes detection errors due to the position of the positioning satellite of, for example, the GPS. Also, the present position can be relatively obtained in accordance with changes in the running distance of the vehicle and the progress direction of the vehicle. At this time, errors in changes in the running distance of the vehicle and the progress direction of the vehicle, if existent, are accumulated in the process of obtaining the present position to cause errors in all the present positions which are obtained after the errors have been caused.

The progress bearing at the present position is detected by the vehicle bearing detecting means such as a gyrocompass or the like. The progress bearing indicates the running direction of the vehicle at the moment when the vehicle has passed the present position. The so-called progress bearing is a tangential direction of the running track of the vehicle to the present position. For example, the progress bearing is relatively obtained by detecting the turning amount using the gyrocompass when the vehicle is turning, and by accumulating the turning amounts. Also, the progress amount can be detected with the use of the geomagnetic sensors or the like. The progress bearing detected by the geomagnetic sensors is an absolute bearing with the north being represented as zero degree of the standard. Errors are also often caused when detecting these progress bearings.

The present position and the progress direction of the vehicle are given to the map matching means. As described above, the detected present position and progress direction of the vehicle include detection errors. To reduce the errors, the map matching means corrects the detected present position by moving the position onto the recorded road, assuming that the vehicle is running on the road.

First, the map matching means reads out to the reading means, from the road data recording means, the road data about the road around the present position of the vehicle. In accordance with the road data read, the road retrieving means retrieves the road portions near the detected present position of the vehicle. The road portions retrieved regards the present position measured as the roads of the candidate to be corrected. The road retrieving means retrieves a plurality of road portions positioned within the predetermined portions around the present position and regards all these road portions as correcting candidates.

The roads which are recorded in the present position recording means are simplified and displayed as links of segments showing only the length and direction of the roads. The road of curved lines are approximated in the construction where the road portions which are represented with a plurality of segments which are connected sequentially with the end portions of the links. Both the ends of the road portion are the nodes of the corner, intersection points of the road. The road data are data showing the segments of these road portions. In the road data of the respective road portions, the width, grade and small curves of the roads are simplified. Therefore, it is difficult to obtain the extension of the distance from the road data when the running distance has been extended due to the intersection points turned at larger curvature in the passing of the intersection points of the wide road. The detected present position does not agree with the position on the road in the road data, because the road data are simplified in addition to the measured errors of the above described present position.

The similarity degree calculating means calculates the similarity degree individually with respect to the road portions of the correcting candidates. The similarity degree is used as comparison materials between the running history and the road portion. The similarity degree is expressed in numeric value of similarity between the running history and the road portion in size. The larger the value becomes, the higher the similarity becomes. The similarity degree is calculated in accordance with the road bearing of the road portion, the present position and progress bearing of the vehicle. The map matching means decides the road portions to be corrected in the present position by the comparison evaluation of the similarity degree when a plurality of road portions are provided as correcting candidates. As described later, the similarity degree is used to judge whether or not the present position is corrected.

The position correcting means compares similarity degrees obtained with respect to respective road portions to select the road portion having the largest value of the similarity degree. The position is not corrected for a first time when the similarity degree with respect to the road portions is smaller than the predetermined threshold value continuously for at least the predetermined section. Namely, the present position is corrected into the road portions when the measured present position has approached to the single road portion continuously for the predetermined section.

As described above, the measured present position sometimes does not agree with the corresponding position on the road data due to detection errors of each detecting means and the accuracy errors of the road data. Thus, the position correcting means corrects the present position onto the road because the means regards that the vehicle is running on the road when the similarity degree exists within the predetermined range of predetermined threshold or more if the measured present position is out of the road. The range may be approximately several hundreds of meters and, in size, may be more than the distance between roads or more when two roads have been approached.

To reduce the data amount, data about the existing road are sometimes omitted partially from the road data recorded in the recording means described above. For example, expressways, national roads or the like are recorded, but roads narrower in width, roads less in traffic amount, or the like are omitted in data. Data about roads opened after the road data making may not be recorded in the road data older in date. The detected present position of the vehicle comes off from the known roads recorded when the vehicle is running on the unknown road, when the map match processing is effected in accordance with the road data having unknown roads not recorded as road data. Therefore, the running track comes off from the road shape.

It is difficult to distinguish a condition where the running track came off for running on the unknown road from a condition where the running track came off from the known road due to the calculation errors of the above described present position and the precision errors of the road data. The conventional navigation apparatus corrected the present position on the known road as in the coming off of the running track due to errors even when the running track has come off due to the running on the unknown road. When such a correcting operation is effected, the navigation apparatus recognizes that the vehicle is on the known road on which the vehicle is not actually running. Therefore, the errors of the present position increases, thereby interfering with subsequent navigation.

As described above, the position correcting means corrects the present position only when the similarity degree is continuously a threshold value or more. The section where the running track of the vehicle is similar to the road shape of the known road is considered to be shorter when the vehicle is running on the unknown road. Therefore, it is rare that the similarity degree becomes continuously larger. It is considered that the shape of the running track and the road shape are similar for long sections when the present position and so on are deviated due to errors. The present position is corrected only when the similarity degree is large continuously at this time, and it can be distinguished whether the similarity degree is lowered due to errors or the similarity degree is lowered due to running on the unknown road. Therefore, the correction of present position by mistake can be prevented when the vehicle is running on the unknown road.

According to the invention as described above, the vehicle position detecting apparatus can correct the position for a first time when the similarity degree is larger than the predetermined threshold value continuously for at least predetermined section through the similarity degree which is an index between the road portion and the running history of the vehicle.

When the vehicle runs on the unknown road not recorded on the apparatus, it is considered rare that a section where the running track of the vehicle and the road shape of the known road are similar is short and the similarity degree becomes larger continuously. When the vehicle is running on the known roads recorded on the apparatus, and the present position and so on come off due to the measured errors, it is considered to be similar in a longer section between the shape of the running track and the road shape. Therefore, the present position is corrected only when the similarity degree is large continuously, and the present position can be prevented from being corrected into the known road even if the similarity degree with respect to the known road increases by accident when the vehicle is running on the unknown road.

By the above description, the errors of the vehicle present position and the progress bearing can be prevented from being increased. The measuring errors can be prevented from being increased when the present position and the progress bearing is relatively measured especially with the use of the gyrocompass, the vehicle speed sensor, and so on. Also, location (map matching) accuracy improves because the present position improves only on roads higher in reliability. Thus, the practical use of the vehicle position detecting apparatus can be improved.

The invention provides a vehicle position detecting apparatus comprising:

road data recording means for recording road data composed of a plurality of linear road portions;

reading means for reading out the road data from the road data recording means;

present position detecting means for detecting a present position of a vehicle;

vehicle bearing detecting means for detecting a progress bearing corresponding to a progress direction of the vehicle at the present position; and map matching means for responding to outputs of the reading means, the present position detecting means and the vehicle bearing detecting means;

wherein the map matching means compares a running history in accordance with the present position and the progress direction of the vehicle with the road data read out; evaluates the similarity degree so as to give priority to a downstream side road portion which is the same direction as the progress direction of the vehicle over an upstream side road portion which is the reverse direction to the progress direction of the vehicle; and corrects the present position of the vehicle on the road portions of the road data.

According to the invention, the vehicle position detecting apparatus detects the present position of the vehicle, and corrects the present position in accordance with the plurality of road portions and the running history of the vehicle so as to obtain the final present position.

The present position of the vehicle is detected by a present position detecting means such as a GPS and so on. The present position detected with the GPS is represented by an absolute position which is represented with latitude and longitude. The present position detected with the GPS includes detection errors due to the position of the positioning satellite of, for example, the GPS. Also, the present position may be obtained relatively in accordance with changes in the running distance of the vehicle and the progress direction of the vehicle. At this time, errors in changes in the running distance and the progress direction of the vehicle, if existent, are accumulated in the process of obtaining the present position to cause errors in all the present positions which are obtained after the errors have been caused.

The progress bearing of the vehicle in the present position is detected by the vehicle bearing detecting means such as gyrocompass or the like. The progress bearing is a bearing corresponding to a direction along which the vehicle is progressing. For example, the progress bearing is obtained relatively by the detection of the turning amount at the turning time of the vehicle with the use of the gyrocompass and the accumulation of the turning amounts. The progress bearing may be detected with the use of geomagnetic sensors. The progress bearing detected by the geomagnetic sensors is an absolute bearing with the north being represented as a zero degree of the standard. Errors are also often caused when detecting these progress bearings.

The present position and the progress direction of the vehicle are given to the map matching means. As described above, the detected present position and progress direction of the vehicle include detection errors. To reduce the errors, the map matching means corrects the present position which is detected by moving the position onto the recorded road, assuming that the vehicle is running on the road.

The map matching means reads out to the reading means, from the road data recording means, the road data about the roads around the present position of the vehicle.

The roads recorded in the recording means are simplified and displayed as links of segments showing only the length and direction of the road. The roads of curved lines are approximated in the construction where the road portions represented with a plurality of segments are connected sequentially with the end portions of the links. Both the ends of the road portion are the nodes of corners, and intersection points of the road. The road data are data showing the segments of these road portions.

In the road data of the respective road portions, the width, grade and small curves of the roads are simplified. Therefore, it is difficult to obtain the extension of the distance from the road data when the running distance has been extended due to the intersection point turned at larger curvatures in the passing of the intersection points of the wide road. The detected present position and running distance sometimes do not agree with the position on the road and the running distance on the road data.

First, the map matching means compares the running history of the vehicle determined in accordance with the progress bearing and the present position of the vehicle with the road data read out. Similarity degree is used as comparison materials between the running history and the road portion. The similarity degree is put into numeric characters of the similarity in size between the running history and the road portion. The map matching means determines the road portions to be corrected in the present position by the evaluation of the similarity degree when a plurality of road portions are provided as correcting candidates.

At this time, not only are the downstream side road portion on the same direction side as the progress direction of the vehicle as compared with the present position of the vehicle in the past provided as candidates, but also the upstream side road portion on the side of a direction reverse to the progress direction of the vehicle as compared with the present vehicle position in the past is sometimes provided as the candidates of the road portions to be corrected in the present position. When the newest present position is corrected in the downstream side road portion, the road portion runs only in one way direction from the present vehicle position in the past to the newest present position. The vehicle is reversed to the road portion where the present position in the past exists for the vehicle to reach from the present position in the past to the newest present position when the newest present position is corrected into the upstream side road portion.

It is considered rare for the vehicle to be reversed onto the same road portion. Thus, when the upstream side and the downstream side road portions are provided as the candidates of the road portions to be corrected, the upstream side road portion is considered due to the detection errors of the present position or the progress bearing, and to the precision deterioration of the map caused by the simplification of the road data. The map matching means effects the similarity degree evaluation so as to select the downstream side road portion on the same direction side as the progress direction of the vehicle, instead of the upstream side road portion on the direction side reverse to the progress direction of the vehicle, as the road portion to be corrected preferentially.

Assume that the similarity degree, when large, is selected as road portions to be corrected, the downstream side road portion is selected as road portion to be corrected when the similarity degree calculated between the upstream side road portion and the downstream side road portion is equal. The downstream side road portion is selected as a road portion to be corrected also when the calculated similarity degree of the upstream side road is slightly larger than the similarity degree calculated of the downstream side road portion. Selection of the upstream side road portion as a road portion to be corrected is limited when the similarity degree of the upstream side road portion is extremely larger than the similarity degree of the downstream side road portion. When the road portion to be corrected is selected, the map matching means corrects the present vehicle position onto the road portion selected.

When the present position is corrected in this manner, the road portion to run in one direction for the vehicle to pass only in a one way direction is selected as a road portion to be corrected preferentially, considering the progress direction of the vehicle. Thus, the correction of the present position onto the road portion can prevent the running track, after the correction, from being reversed to be deviated from the actual running history. Especially, the correction so that the running history may be reversed can be prevented even when the detection error of the present position and the running bearing errors caused by simplification of the road data are larger. And the running history can be corrected so as to make U-turn and reverse in accordance with the movements thereof when the vehicle actually makes a U-turn and is reversed because the upstream side road portion does not come off from the candidate of the road portion to be corrected.

According to the invention as described above, the vehicle position detecting apparatus corrects the detection result in accordance with a plurality of road portions and the running history of the vehicle to obtain the final present position to reduce the detection errors included in the detection result of the present position of the vehicle. At this time, the road portion for correcting the present position is selected preferentially in the road portion existing on the downstream side in the progress direction of the vehicle. When the present position is taken into consideration in the road portion existing on the upstream side in the progress direction of the vehicle, it is regarded that the vehicle has reversed along the same road portion. It is rare that the vehicle reverses because such correction result is caused due to detection errors of the present position or the progress bearing, and due to precision deterioration in the road data showing the road shape of the road portion.

Accordingly, the present position can be prevented from being corrected into such road portion to reverse even when the road portion on the upstream side is similar to the running history more than the road portion on the downstream side in a condition where the precision of the running history and the road shape is low. Also, the present position can be corrected onto the road portion on the upstream side in accordance with the movements thereof when the vehicle actually makes a U-turn and reverses, because the upstream side road portion does not come off from the candidates of the road portion to be corrected. The positional correction of the vehicle higher in stability can be effected even when errors exist in the road shape, the running history and so on. Thus, a map match processing having a highly practical use can be realized.

The invention provides a vehicle position detecting apparatus comprising:

road data recording means for recording road data composed of a plurality of linear road portions;

reading means for reading out the road data from the road data recording means;

present position detecting means for detecting a present position of a vehicle;

vehicle bearing detecting means for detecting a progress bearing corresponding to a progress direction of the vehicle at the present position; and map matching means for responding to outputs of the reading means, the present position detecting means and the vehicle bearing detecting means;

wherein the map matching means corrects the present position of the vehicle respectively into a plurality of correcting candidate points; obtains and accumulates a similarity degree between the road portions to which each correcting candidate point belongs to and a running history based on the present position and the progress direction of the vehicle in parallel with respect to each correct candidate point every time an inflection point is passed; and considers a correction candidate point having a largest accumulation result as an accumulation result of the present position of the vehicle.

According to the invention, the vehicle position detecting apparatus detects the present position of the vehicle and corrects the present position in accordance with the road shape of a plurality of road portions and the running track of the vehicle, thus obtaining the final present position.

The present position of the vehicle is detected by the present position detecting means such as a GPS or the like. The present position detected with the use of a GPS is represented in the absolute position expressed with, for example, latitude and longitude. The present position detected with the GPS includes detection errors due to the positions of the positioning satellites of, for example, the GPS. Also, the present position may be obtained relatively in accordance with changes in the running distance of the vehicle and the progress direction of the vehicle. At this time, errors in changes in the running distance of the vehicle and the progress direction of the vehicle, if existent, are accumulated in the process of obtaining the present position to cause errors in all the present positions which are obtained after the errors have been caused.

The progress bearing in the present position is detected by the vehicle bearing detecting means. The progress bearing corresponds to the running direction of the vehicle which shows the running direction of the vehicle in a moment when the vehicle has passed the present position. The so-called progress bearing is a tangential direction of the running track of the vehicle in the present position with the direction being equal to the running direction of the vehicle. For example, the progress bearing is obtained relatively by the detection of the turning amount of the vehicle at the turning time of the vehicle with the use of the gyrocompass and the accumulation of the turning amount. Also, the progress bearing is detected with the use of the geomagnetic sensors. The progress bearing detected by the geomagnetic sensors is an absolute bearing, for example, with the north being represented as zero degree of the standard. These progress bearings also often cause errors in the detecting operation.

The present position and the progress direction of the vehicle are given to the map matching means. As described above, the detected present position and progress direction of the vehicle include detection errors. To reduce the errors, the map matching means corrects the detected present position by moving the position onto the recorded road, assuming that the vehicle is running on the road.

First, the map matching means reads out to the reading means, from the road data recording means, the road data about the road around the present position of the vehicle. The roads recorded in the present position recording means are simplified and displayed as the links of segments showing only the length and direction of the roads. The road of curved lines are approximated in the construction where the road portions represented with a plurality of segments are connected sequentially with the end portions of the links. Both the ends of the road portion are the nodes of the corner and intersection points of the road. The road data are data showing the segments of these road portions.

In this manner, in the road data of the respective road portions, the grade and small curves are simplified. Therefore, it is difficult to obtain the extension of the distance from the road data when the running distance has been extended due to the intersection point turned at larger curvature in the passing of the intersection points of the wide road. There are such road data simplified in addition to the measured errors of the above described present position as causes where the detected present position does not agree with the position on the road data. The present position of the vehicle on the road is sometimes deviated longitudinally in a direction along the running direction of the vehicle especially when the measured vehicle running distance is different from the running distance which is obtained from the road data.

The matching means sets a plurality of correcting candidate points on the road portion for satisfying the conditions described below from among the road portions near the measured present position. The correcting candidate points are set to become mutually longitudinal in a direction along the running direction of the wheel in, for example, the same or continuous road portion. Also, when a plurality of correcting candidate points are set in the correction preceding the latest correction of present position and progress bearing, the present position is regarded to be corrected to the plurality of correcting candidate points and successive correcting candidate points are set according to the plurality of correcting candidate points. Also, the points may be set respectively on two branched roads in passing the branched points of the road.

The matching means temporarily corrects the present position of the vehicle respectively into these correcting candidate points to obtain similarity degree in parallel with respect to each candidate point. The similarity degree is a judging index showing the similarity between the road portion to which correcting candidates belong, and the running history of the vehicle with each correcting candidate point as reference. The larger value of the similarity degree indicates the higher similarity between the road portion and the running history and the larger possibility of being the correcting candidate points in the actual present position of the vehicle.

Suppose that the present position of the vehicle is obtained in accordance with the running distance and progress bearing of the vehicle. The running track agrees with the road shape when the measured running distance of the vehicle is deviated from the running distance on the road data in the straight running of the vehicle on the linear road because the progress of the vehicle is equal. When the vehicle passes inflection points, such as bent portions of the road, the running history slides in curving timing by the deviation of the running distance and the error portion of the road data. The running history obtained from the measured present position bends immediately before the inflection point on the road data in the actual passing the inflection points of the road when the measured present position is deviated onto the upstream side in the running direction from the actual present position. The deviation reduces the similarity degrees near the inflection points.

When the vehicle passes the inflection point with the correcting candidate points being set before and after the inflection point on the road, the road bearing of the road portion to which each correcting candidate point belongs is different. Thus, the similarity degree with respect to each correcting candidate point no longer agrees. The difference in the similarity degree with respect to each correcting candidate point becomes larger with the larger difference in the road bearing of the road portion before and after the inflection point.

The similarity degree obtained in this manner is accumulated for each correcting candidate point. The matching means regards, as the present correcting result of the vehicle, the correcting candidate point largest in the accumulating result to effect navigation in accordance with the correcting candidate point. Namely, the map matching means selects a correcting candidate point which is estimated as the nearest to the present position of the actual vehicle in accordance with the accumulated results of the similarity degree with respect to each correcting candidate point.

As described above, the difference in the similarity degree is smaller when the shape change in the inflection point of the road is smaller. Therefore, sometimes it is not distinguished between the reduction portion in the similarity degree due to deviation of the running distance and the reduction portion in the similarity degree due to the measuring error of the present position and the accuracy error of the road data. When the vehicle often passes points changed in road shape, such as inflection points and branched points at this time, the similarity degree with respect to the correcting candidate points set out of the actual position of the vehicle is reduced every time the vehicle passes the inflection points and the branched points. The difference in the similarity degree increases by the accumulation of the similarity degree when the frequency of the cause of the difference in the similarity degree increases. Accordingly, the accumulation results of the similarity degree with respect to the best correcting candidate point nearest to the actual present position become largest.

Therefore, the best correcting candidate point can be selected with the use of a plurality of correcting candidate points when the road has inflection points. The deviation of the correcting candidate points along the vehicle progress bearing can be corrected. Also, the deviation of the present position of the vehicle can be corrected even when the branch point of the road does not exist.

According to the invention as described above, the vehicle position detecting apparatus detects the present position of the vehicle and corrects the present position in accordance with a plurality of road portions and the running history of the vehicle, thus obtaining the final present position. At this time, the map matching means sets a plurality of correcting candidates in the road portions near the present position measured. The calculation results are accumulated and added in the similarity degree calculation in parallel with respect to these set correcting candidate points. The correcting candidate point largest in the accumulation adding result is judged as the correcting candidate points to be corrected in the present position.

The larger value of the similarity degree changes with larger difference in the road bearing of two road portions connected at the inflection point of the road. When the shape change in the road at the inflection points is small, it may not be distinguished whether the cause for reduction in the similarity degree is the deviation in the running distance or the measured error of the present position. Assume that the present position is corrected respectively into the plurality of correcting candidate points set in the present position, and the temporary corrections of the present position are later effected in parallel in accordance with each correcting candidate point. Upon correction of the present position with the correcting candidate point, which does not agree with the present position of the actual vehicle, as reference, and the similarity degree even in the passing of the next inflection point is also reduced. Accumulate additionally the similarity degree which is reduced each time the vehicle passes the inflection points like this, and the difference increases between the accumulated result with respect to the correcting candidate point in agreement with the position of the actual vehicle and the accumulated result with respect to the correcting candidate point not in agreement. Therefore, the correcting candidate point which agrees with, or is close to, the present position of the actual vehicle can be selected certainly.

Roads of inflection points, if existent, can select the best correcting candidate point with the use of a plurality of correcting candidates. By the above method, the errors of the correcting candidate points along the vehicle progress bearing can be reduced. Also, the deviation of the present position of the vehicle can be corrected even when the branch points of the road do not exist. Therefore, the navigation apparatus having a locating (map matching) apparatus high in practical use can be realized since the navigation can be carried out with the use of more correct present positions.

Figure 1:
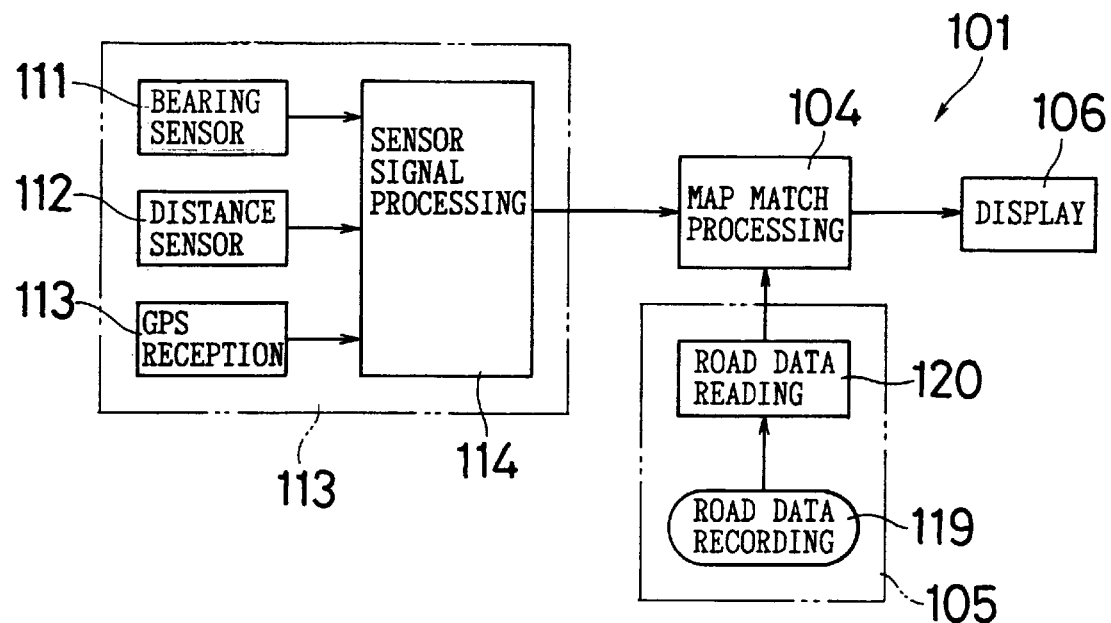
FIG. 1 is a block diagram showing the functional construction of a navigation apparatus 101 in one embodiment of the invention.
Figure 2:
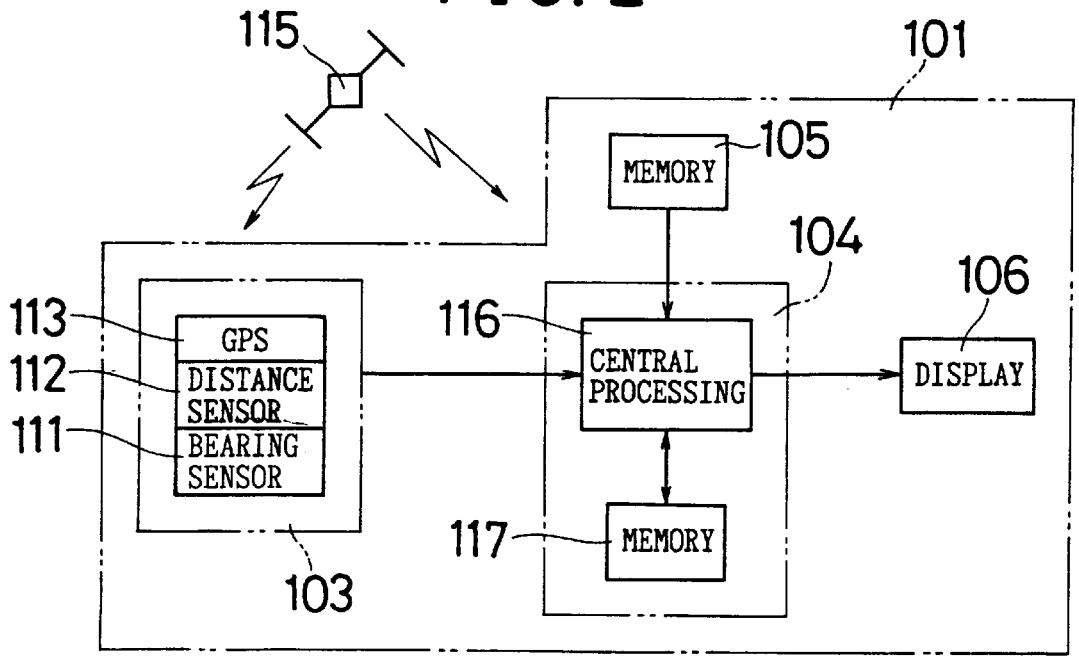
FIG. 2 is a block diagram showing the electric construction of the navigation apparatus 101.
Figure 12:
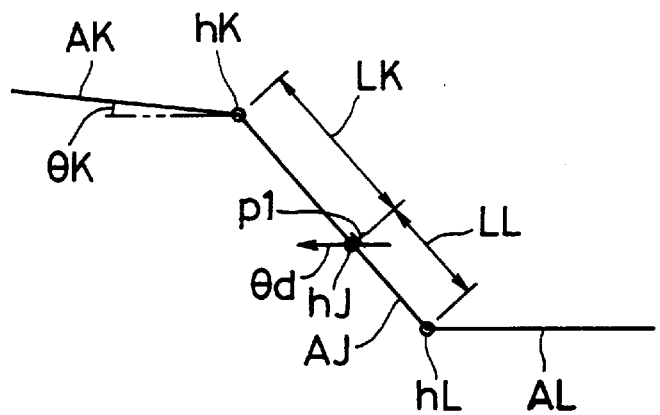
Figure 13:
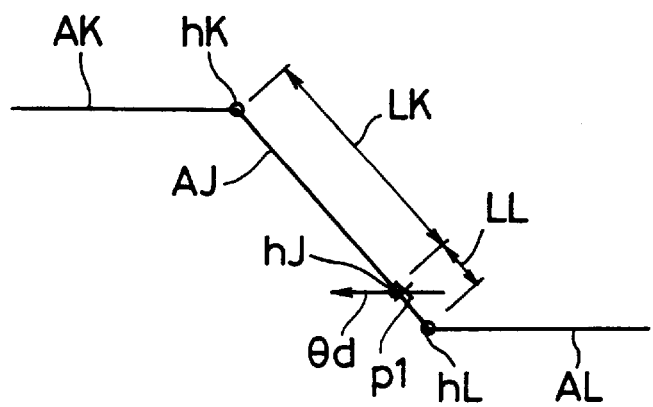
Figure 14:
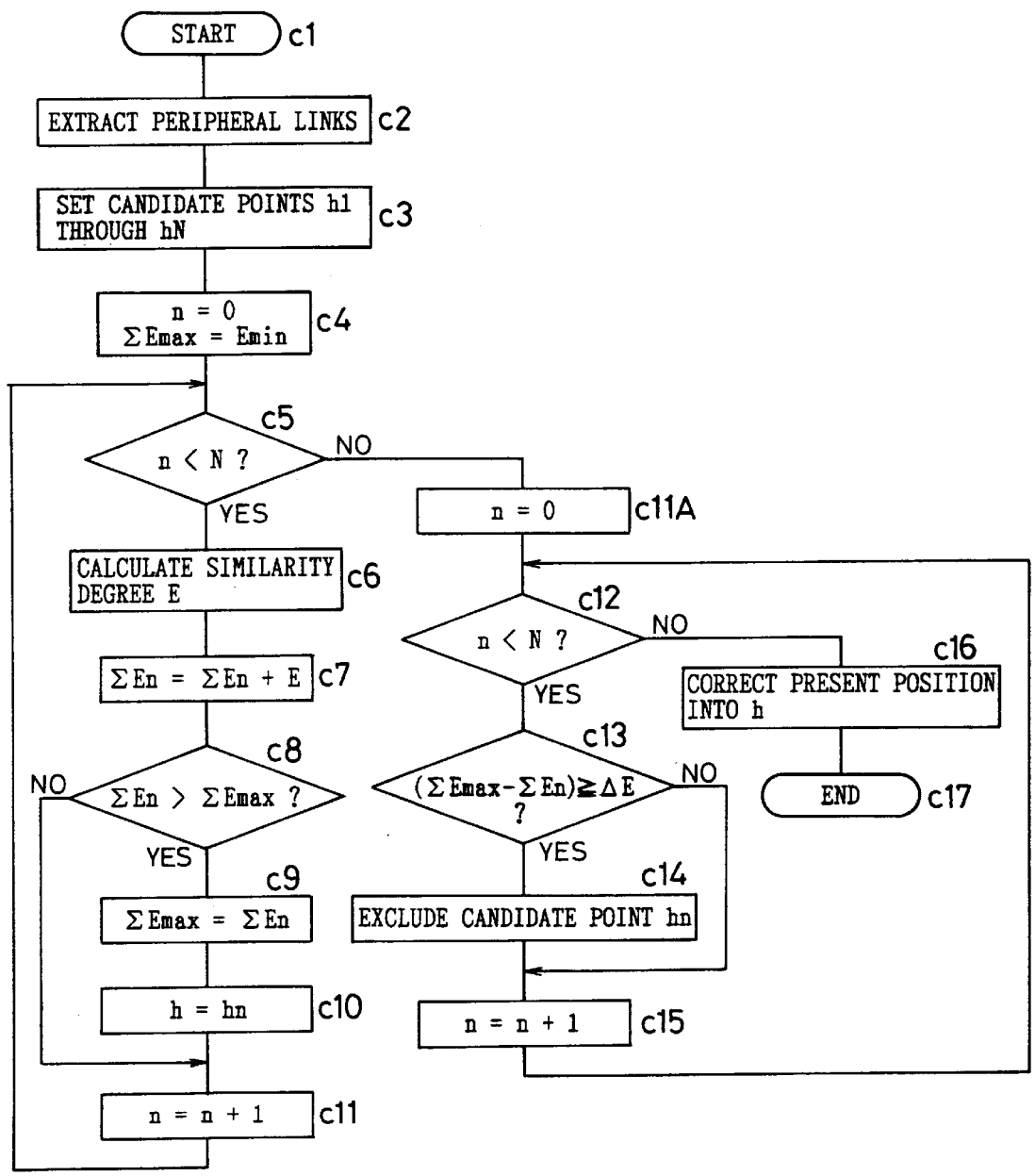
Figure 15:
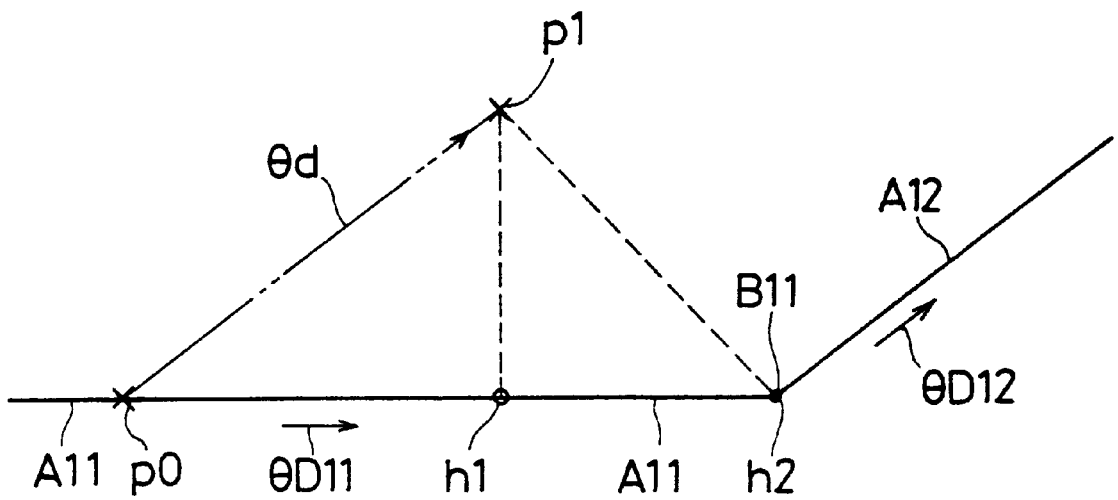
Figure 16:
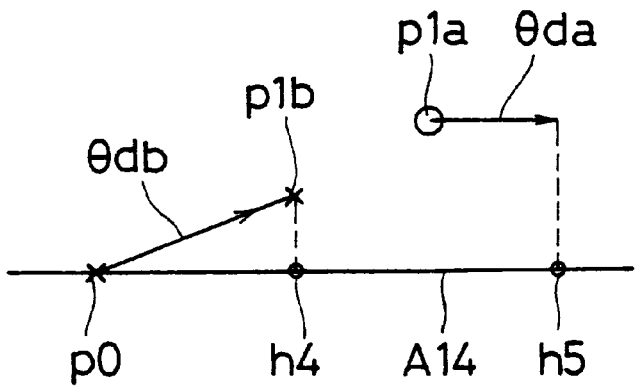
Figure 17A:
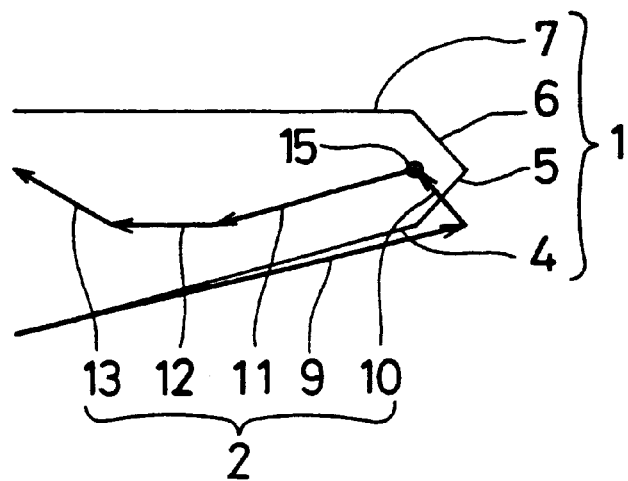
Figure 17B:
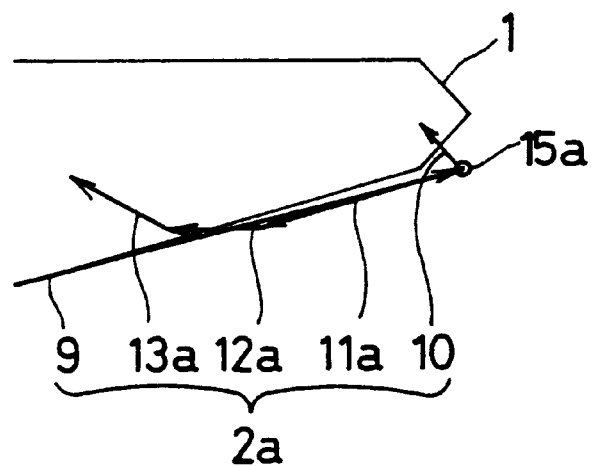
Figure 18A:
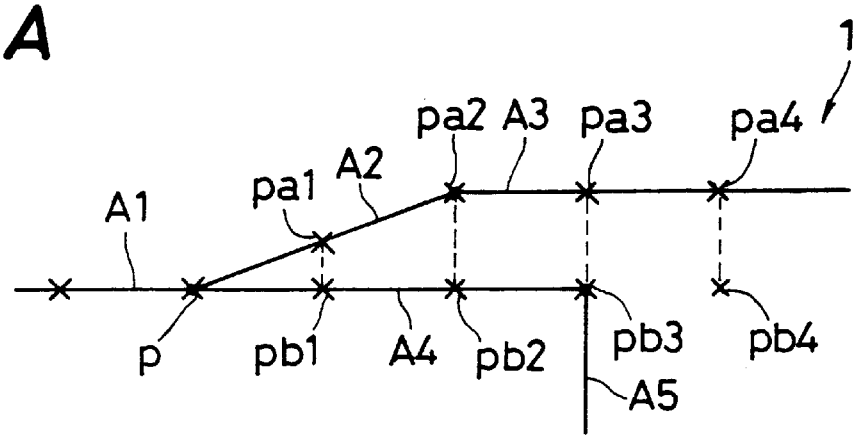
Figure 18B:
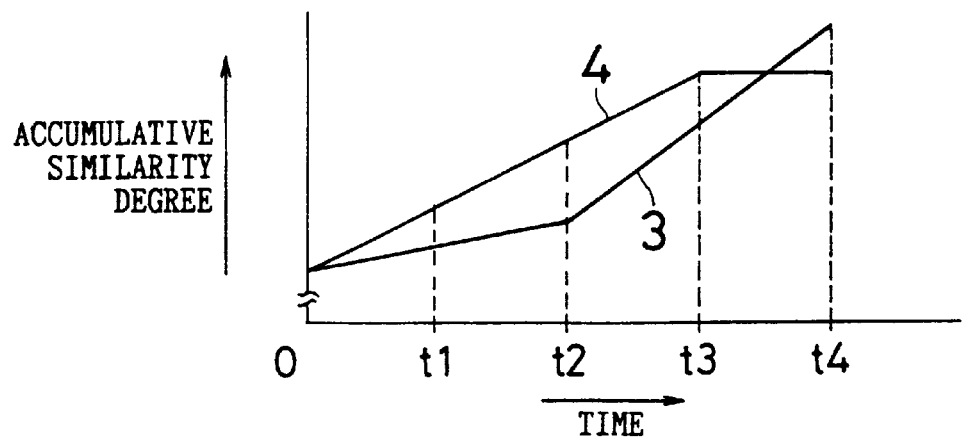

FIG. 12 is a diagram showing the positional relationship among links AL, AJ, AK and a measured present position p1 in the selection of the running track progressing in a one way direction in the present embodiment;

FIG. 13 is a diagram showing the positional relationship among links AL, AJ, AK and a measured present position p1 in the selection of the running track of making a U-turn and reversing in the present embodiment;

FIG. 14 is a flow chart for illustrating the positional detecting operation which is effected in the navigation apparatus 101 of FIG. 1 and FIG. 2 in still another embodiment of the invention;

FIG. 15 is a view showing the positional relationship between the correcting candidates h1, h2 set near the inflection point of the road and the measured present position p1;

FIG. 16 is a diagram showing the positional relationship between the peripheral link A and the measured present position;

FIG. 17A is a diagram showing a running track 2 which is measured when the vehicle runs on the road 1 in the navigation apparatus of the conventional art;

FIG. 17B is a diagram showing the running track 2a corrected with respect to the running track 2 of FIG. 17A;

FIG. 18A is a diagram showing the correcting candidate points which are set in the navigation apparatus of the conventional art; and FIG. 18B is a graph for illustrating time changes in the accumulation result of the similarity degree in each correcting candidate point of FIG. 18A.

DETAILED DESCRIPTION OF THE PREFERRED EMBODIMENTS

FIG. 1 is a block diagram showing the functional construction of a navigation apparatus 101 in one embodiment of the invention. FIG. 2 is a block diagram showing the electric construction of the navigation apparatus 101. FIG. 1 and FIG. 2 will be described together.

The navigation apparatus 101 provides, to a map match processing portion 104, the measured present location and progress bearing of the vehicle measured with the use of the position and bearing measuring portion 103 for each predetermined period. The map match processing portion 104 reads out the road data on the road close to the measured present position from a memory apparatus 105 to effect the map match processing of the measured present position with respect to the road which is expressed with the road data. The road data read out is visually displayed on the visual display region of a displaying apparatus 106. For example, the predetermined diagrams are displayed on the visually displayed road data superimposedly on the positions corresponding to the corrected present position as the matching result of the measured present position of the vehicle. The present position of the vehicle recognized by the navigation apparatus 101 is presented for a user of the apparatus 101.

A position and bearing measuring portion 103 is composed of, for example, a bearing sensor 111, a distance sensor 112, a GPS receiver 113, and a sensor signal processing circuit 114. The bearing sensor 111 detects the progress bearing of the vehicle to guide the output to the sensor signal processing circuit 114. The progress bearing of the vehicle corresponds to the running direction of the wheel in a certain measuring point when the vehicle runs on the road or the like. Namely, the vehicle runs in a direction along the progress bearing at a time point where the vehicle has passed on a certain measuring point.

The bearing sensor 111 is realized by an apparatus for outputting the revolution speed or the revolution angular speed of the rotor within the apparatus, such as vibrating gyrocompass, optical fiber gyrocompass, gas rate sensor or the like. When outputs are given from such an apparatus, the sensor signal processing portion 114 calculates the rotation angle or the rotation angular speed from the reference point in accordance with the output to add with the angle as a reference to obtain the progress bearing. The calculated progress bearing becomes a relative bearing when the vibration gyrocompass, the optical fiber gyrocompass, the gas rate sensor or the like is used in this manner. Also, the progress bearing can be realized by the geomagnetic sensor which detects the geomagnetism on the earth to output the absolute progress bearing.

The distance sensor 112 is realized by, for example, a vehicle speed sensor. The vehicle speed sensor guides, to the sensor signal processing circuit 114, vehicle speed pulse signals for outputting pulses each time the vehicle runs by a predetermined unit running distance. The vehicle speed sensor, mounted near a vehicle shaft or the like for giving the revolving force to the wheels of the vehicle, outputs the pulse of the predetermined number set for each vehicle per revolution of the wheel, corresponding to the revolving angle when the construction is rotated. The sensor signal processing circuit 114 counts the number of pulses of the vehicle speed pulse signal outputted by a counter to obtain the running distance of the vehicle in accordance with the number of the pulses counted.

The GPS receiver 113 measures the present position of the vehicle. The GPS receiver 113 receives signals from at least four positioning satellites 115 or more and from among the plurality of positioning satellites 115 rotating on the orbit around the earth, to obtain the distance between each satellite 115 and the vehicle from differences between arrival time of the signals. The absolute positional coordinates of latitude, longitude and so on of the present position of the vehicle are obtained from the obtained distance in accordance with the triangular location survey method. Also, the GPS receiver 113 can obtain the progress bearing of the vehicle with the use of the Doppler effect of estimating in accordance with the moving direction of the frequency of the signal from the positioning satellite 115 when the vehicle is running at a predetermined speed or more. Namely, the absolute progress bearing of the vehicle can be obtained from the positions of the vehicle, the positioning satellite 115, and the estimation amount of the frequency of the signal. The obtained positional coordinates and progress bearing of the present position of the vehicle are given to the sensor signal processing circuit 114.

The position and bearing detecting portion 103 obtains the positional coordinates of the present position of the vehicle which is represented, for example, in the latitude and longitude. Also, the progress bearing of the vehicle which is shown with the north as zero degree of the reference is obtained. Only one portion of the above described bearing sensor 111, the distance sensor 112, and the GPS receiver 113 has to be provided when the construction is adapted to obtain the absolute present position and progress bearing. For example, the position and bearing measuring portion 103 may be provided only with the relative bearing sensor 111 as a gyrocompass, and a distance sensor 112 as a vehicle speed sensor. Also, the progress bearing may be obtained with the use of the Doppler effect of the signals from the positioning satellite 115 with the GPS receiver 113 only being provided.

A central processing apparatus 116 and a memory 117 function as the construction of the sensor signal processing circuit 114 and the map match processing portion 104.

The outputs from each sensor 111, 112, the GPS receiver 113, the measured present position, and the progress bearing of the vehicle, which is given to the map match processing portion 104 from the position and bearing measuring portion 103, are stored in the memory 117. The central processing apparatus 116 calculates various calculations with the use of these input results and the road data from the memory apparatus 115.

The memory apparatus 105 records the road data corresponding to the various maps on a road data recording medium 119 for recording the road data. The roads memorized in the recording medium 119 are simplified and displayed as segments showing only the length of the road and the direction capable of running. The directions capable of running on the roads are referred to as road bearings. The road is composed of a plurality of links as segments which are connected to each other. The link has the corners of the road and the intersection points and so on as both ends, the end portions being referred to as nodes. In the link, another link is connected with at least one node.

Also, the road data recorded on the recording medium 119 are sometimes omitted to reduce the data amount partially in the data about the existing roads. The data of the roads where the running vehicles are lower in number on narrower roads, and the traffic amount is less and so on are omitted although only the data of the roads are recorded where the traffic amount is heavy and many vehicles are running in possibility on expressways, national roads and so on. Also, the data about the newly opened roads after the road data were made may not be recorded when the date when the road data are made is old. Hereinafter, the roads recorded in data in the recording mediums 119 and links for forming the roads are referred to as known roads and known links. The roads whose data are not recorded in the recording medium 119 and the links for forming the roads are referred to as unknown roads and unknown links.

The recording mediums 119 such as CD - ROM, IC card and so on are realized in construction to be detachable from the memory apparatus 105, or such non-detachable construction such as a disk of the hard disk apparatus will do. The road data recorded in the recording medium 119 are read out with the use of a road data reading apparatus 120 and is given to the central calculating apparatus 116 of the map match processing portion 104.

Figure 3:
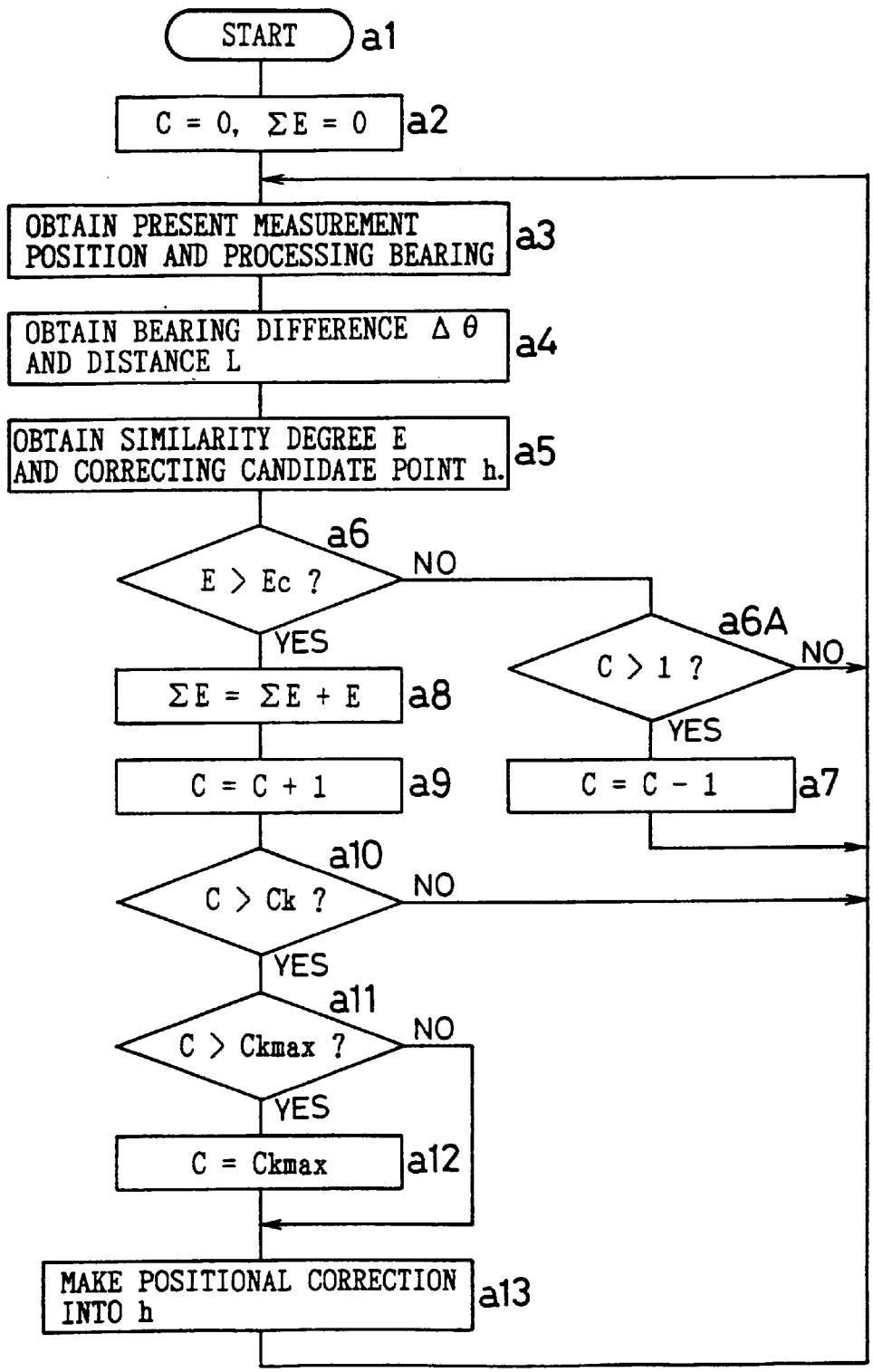
FIG. 3 is a flow chart for illustrating the position detecting operation which is effected in the navigation apparatus 101.

FIG. 3 is a flow chart for illustrating the positional detecting operation which is effected in the navigation apparatus 101. In the navigation apparatus 101, the present position of the vehicle measured in the position and bearing measuring portion 103 is corrected through the match processing in the map match processing portion 104. The match processing is used to correct the measured present position of the vehicle onto the road when the running tracks are similar within a constant range to the road shape in the comparison between the running track of the vehicle which is stored in advance and the road shape of the road data. In the match processing, it is assumed that the vehicle is running on the road shown on the road data and the similarity degree with respect to the road is calculated to correct the present position of the vehicle with the similarity degree as a judging reference.

Step a1 advances to step a2 when the navigation apparatus 101 is put to work for starting. At step a2, the initial setting of the position correction is carried out. At first, zero is substituted for resetting into a counter C for counting the frequency which is a predetermined threshold value or more in similarity degree. The value of the counter C is a judging element for judging whether or not the positional correction should be effected. Also, an accumulation similarity degree ΣE which is a variable for storing the accumulation adding results of the similarity degree described below is reset into 0. The accumulation similarity degree ΣE is a judging element for judging into which link the measured present position should be corrected when a plurality of candidates for links to be corrected in the present position of the vehicle measured in the position and bearing measuring portion 103 are present.

Step a2 advances to step a3 after completion of the initial setting. At step a3, the measured present position and the progress bearing are obtained. The sensor signal processing circuit 114 acquires the signal from the sensors 111, 112 and the GPS receiver 113 for each predetermined time T. The sensor signal processing circuit 114 obtains the measured present position and progress bearing in accordance with the acquired signal to give the result to the map match processing portion 104. The measured present position and progress bearing are obtained and then step a3 advances to step a4.

At step a4, a map match processing portion 4 retrieves and obtains, from the measured present position and progress bearing, the peripheral link which becomes a correcting candidate for correcting the measured present position. The peripheral link is retrieved by the following method.

A first method is used, for example, when the measuring of the present position of the vehicle is effected for a first time and when the measured present position has been measured again after the measured present position was not corrected with the correction of the measured present position being impossible to effect. It is impossible to correct the measured present position when the measured present position is largely deviated from the data of the recorded road, because the vehicle was running on a road except for the roads recorded in the recording medium 119. The first method retrieves and extracts all the links included in the predetermined range around the positional coordinates of the measured present position of the vehicle. The predetermined range is a circular interior portion of, for example, several hundreds of m in radius.

Also, a second method is used when the measured present position has been measured continuously after the measured present position was corrected at least once. In the second method, the retrieval and extraction of only a link connected with the nodes of both the ends of a link where the corrected present position exists occurs, which link is included in a predetermined range in which the past corrected present position, which is the corrected result of the previous measured present position, is used as a reference. The predetermined range is a group of links connected in, for example, tens of meters in route length, values several times the largest distance which the vehicle can run from the previous measuring to the new measuring at the running speed in the previous measured present position.

Links retrieved by such a method is a peripheral link. When a plurality of peripheral links are retrieved, the subsequent progress operation is effected individually for each link.

Figure 4:
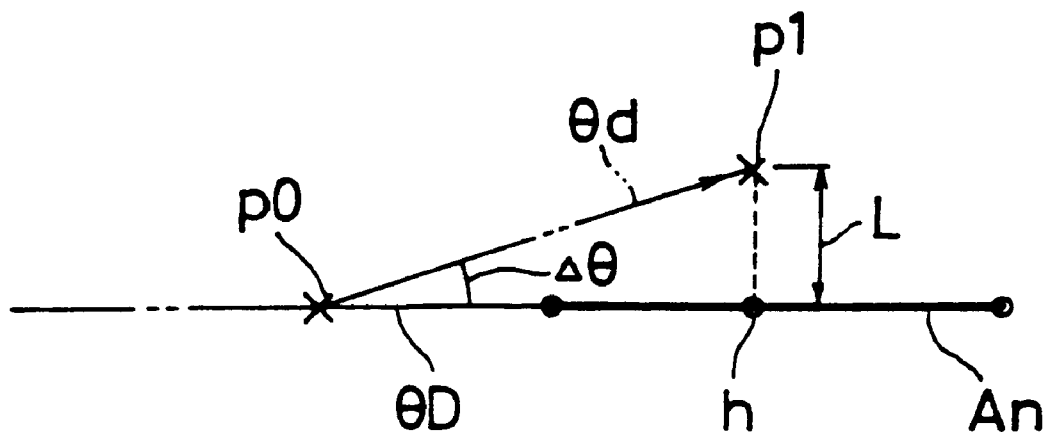
FIG. 4 is a view showing the positional relationship between a peripheral link An and a measured present position p1.

Bearing difference Δθ and distance L with respect to the peripheral link are obtained when the peripheral link is determined. FIG. 4 is a diagram showing the positional relationship between a peripheral link An and a measured present position p1. The bearing difference Δθ is an acute angle formed between a vector showing a road bearing θD of the peripheral link An and a vector showing a progress bearing θd. To obtain the bearing difference Δθ, the progress bearing θd is reduced from the road bearing θD to obtain the absolute value of the subtraction result (θD−θd). When the obtained absolute value |θD−θd| is over 180 degrees, 180 degrees are reduced from the absolute value |θD−θd|. Further, when the subtraction result is over 90 degrees, the subtraction result is reduced further from 180 degrees. Thus, the bearing difference Δθ can be obtained. Also, the distance L is the shortest distance between the measured present distance p1 and the peripheral link An. When the bearing difference Δθ and the distance L are obtained, step a4 advances to step a5.

At step a5, a similarity degree E and a correcting candidate point h with respect to the peripheral link An are obtained. The similarity degree E is obtained by the following (1) equation:

$$E = F \times f + G \times g \tag{1}$$

wherein f is a bearing similarity degree, g is a distance similarity degree, F and G are weight coefficients with respect to the bearing similarity degree and the distance similarity degree.

Figure 5:
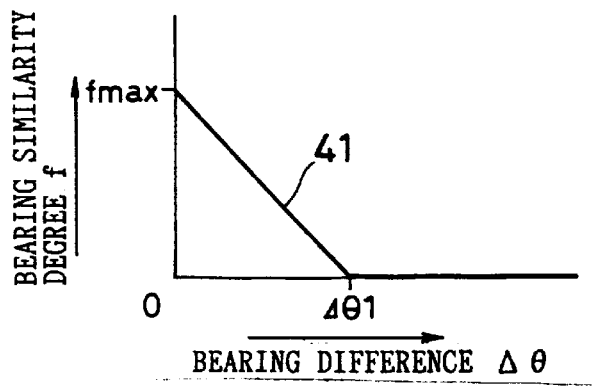
FIG. 5 is a graph showing the relation between a bearing similarity degree f and a bearing difference $\Delta\theta$.

The bearing similarity degree f is determined in accordance with the bearing difference Δθ as shown with solid line 141 of FIG. 5. The bearing similarity degree f is the maximum value fmax when the bearing difference Δθ is 0 at minimum, becomes smaller linearly as the bearing difference Δθ becomes larger, and becomes 0, a minimum value in a bearing difference Δθ1. The distance similarity degree g is determined in accordance with the distance L as shown with solid line 142 of FIG. 6. The distance similarity degree g is gmax, a maximum value, when the distance L is 0, minimum, and becomes smaller linearly as the distance L becomes larger, and becomes 0, a minimum value in a distance DL1.

The weight coefficients F, G are respectively weighed on the bearing similarity degree f and the distance similarity degree g. Namely, it is determined by whether the smaller bearing difference Δθ is weighed or the smaller distance L is weighed in positional correction by the match processing. The weight coefficients F, G are set into, for example, equal values.

The similarity degree E in accordance with the bearing difference Δθ and the distance L with respect to the link An is obtained in this manner. It is shown that the running track of the vehicle between the measuring of the past present position and the measuring of the newest present position is similar to the road shape of the link An as the similarity degree E becomes larger. Also, the shortest point in distance with respect to the measured present position p1 of, for example, the link An is selected as shown in FIG. 4 as the correcting candidate point h when the measured present position p1 is corrected onto the link An. The similarity degree E and the correcting candidate point h are calculated with respect to the link An and then, step a5 advances to step a6. The operation reacts to the similarity degree calculating means from step a4 to step a5.

At step a6, it is judged whether or not the similarity degree E is larger than a predetermined threshold Ec. The similarity degree E becomes larger as the bearing difference Δθ between the progress bearing θd and road bearing θD of the link An becomes smaller. The similarity degree E becomes smaller as the distance L between the new measured present position p1 and the link An is larger. The probability where the corrected present position of the measured present position p1 exists in the link becomes smaller as the similarity degree becomes smaller. For example, the vehicle sometimes runs on unknown road not recorded in addition to the known road recorded in the road data recording medium 19. It is impossible for the link An to exist on the unknown link for forming the unknown road. Therefore, the similarity degree E with respect to the link An becomes extremely smaller as compared with the similarity degree E calculated when the vehicle runs on the link An.

Correct the present position in the above description, and the present position is sometimes deviated from the actual position due to the positional correction performed. To prevent it, the present position is corrected only when the similarity degree is a predetermined value or more continuously for predetermined times in the navigation apparatus 101 in the present embodiment. The present position is not corrected when the similarity degree E is low, namely, when the peripheral link is far from the measured present position pi and road bearing θd is different, because it is considered that the vehicle is not running on the link. The threshold value is a value of the similarity degree when the distance L, for example, between the measured present position p1 and the link An is 100 m through 200 m.

Step a6 advances to step a6A when the similarity degree E is the threshold value Ec or lower, and it is judged whether or not the value of the counter C is 1 or more. When the value of the counter C is 1 or lower, the step returns as it is to step a3. When the value of the counter is 1 or more, step a6A advances to step a7 to subtract 1 from the counter C for renewing, and the step returns to step a3. Also, at this time, zero may be substituted into the counter C for resetting purposes. When the similarity degree E is the threshold value Ec or lower, the present position is not corrected. Therefore, the measured present position p1 is used as it is in the navigation for presenting the present position of the vehicle for the user of an apparatus 1.

When the similarity degree E is the threshold value Ec or more, step a6 advances to step a8 to add the similarity degree E obtained at step a5, to the accumulation similarity degree ΣE for renewing. The accumulation similarity degree ΣE is obtained by the additional accumulation of the similarity degree E obtained with respect to the single road included in the link An. When the peripheral link as a candidate for correcting the measured present position p1 is plural, the present position is renewed in a link whose accumulation similarity degree ΣE is maximum. When the accumulation similarity degree ΣE is renewed, step a8 advances to step a9. In step a9, 1 is added to the counter C for renewing.

The frequency where the similarity degree E is judged to be the threshold value Ec or more like this is counted by the counter C. As described above, the vehicle sometimes runs on unknown road not recorded in a recording medium 39. The unknown road sometimes becomes parallel to the known road in the adjacent portion with the partial portion thereof becoming closer to the known road recorded in the recording medium 39. For example, the road bearing of the unknown road is similar to the road bearing of the known road near the intersection point where the road is connected when the unknown road is connected with the known road so that the difference of the respective road bearings may be smaller. Also, the road bearing of the unknown road is similar to the road bearing of the known road in the curved portion when the curved portion approaches to the known road with the unknown road being curved.

The running track becomes similar to the road shape of the known road when the vehicle runs on the unknown road in such a location as described above. The similarity degree with respect to the link of the known road of the measured present position becomes larger when the measured present position approaches to the known road at this time, so that the similarity degree sometimes becomes a value close to the similarity degree which becomes smaller due to the calculated error of the measured present position and the accuracy error of the map data when the vehicle runs on the known road.

It is difficult for the navigation apparatus 101 to judge whether the vehicle runs on unknown road or the running track is mistaken due to the measured errors, the precision errors of the road data, and so on when the running track is deviated from the known road. Therefore, when whether the present position is to be corrected or not is judged on the basis of only the similarity degree, the present position may be corrected, thereby mistaking that the running track is deviated by the errors even when the similarity degree with respect to the known road increased by accident when the vehicle is running on the above described unknown road.

The section where the similarity degree increases is considered shorter than that when the running track is deviated due to errors when the similarity degree with respect to the known road by accident increased during the running on the unknown road as described above. The section where the similarity degree increases is considered near the intersection point when the known road is connected with the unknown road at a small angle. The section where the similarity degree increases is considered to be only the curved portion of the road and also when the road is curved and approached. Therefore, the navigation apparatus 101 in the present embodiment only corrects when the similarity degree E becomes continuously larger than the threshold value Ec.

When the counter C is renewed, step a9 advances to step a10. At step a10, it is judged whether or not the value of the counter C is larger than a predetermined positional correction judging constant Ck. As described above, the measured present position is measured for each predetermined time T. The calculation of the similarity degree E is effected at each measuring. Therefore, the frequency where the similarity degree E is judged to be larger than that of the threshold value Ec corresponds to time from a time point where the similarity degree E exceeds the threshold value Ec for a first time to the new judgment. Therefore, the correction of the present position is allowed when the value of the counter C is larger than the constant Ck and the time when the similarity degree E continuously exceeds the threshold value Ec becomes the predetermined time or more. The predetermined time is, for example, 10 seconds.

Also, as described above, the value of the counter C is reduced when the similarity degree E is lower than the threshold value Ec. The similarity degree E sometimes reduces temporarily despite no changes in the bearing difference Δθ and the distance L. For example, the GPS receiver 113 for measuring the present position of the vehicle effects triangular surveying with the use of the plurality of positioning satellites 115. The position of each positioning satellite 115 rarely approaches apparently so that the measuring errors may become larger, because the positioning satellites 115 move on the orbit around the earth. Also, the detection results are often given as electric signals from the sensors 111, 112 and the receiver 113. These electric signals are sometimes inferior due to an addition of the external noises. The value of the measured present position p1 becomes inaccurate due to such causes. The value of the similarity degree E which is to be kept at the same level as that obtained in the detecting operation before and after the measuring timing is sometimes temporarily lower.

The correction is carried out no more even if the similarity degree E is actually continuously larger than the threshold value Ec due to such deviation when the value of the counter C is reset to return the value to the initial value when the value of the similarity degree E becomes lower than the threshold value Ec. The correction of the present position is prohibited only when the value of the similarity degree E is continuously lower than the threshold value Ec only in a case where the value of the counter C is reduced at this time. Thus, the correction of the present position can be prevented from being prohibited due to the reduction of small section of the similarity degree E.

Step a10 advances to step a11 when the value of the counter is judged to have exceeded the constant Ck at step a10. At step a11, it is judged whether or not the value of the counter C is larger than the upper limit value Ckmax of the counter. When the value is over the upper limit value Ckmax, step a11 advances to step a12 and advances to step a13 after the renewing by substitution of the upper limit value Ckmax into the counter C. The step advances as it is to step a13 when the value is the upper limit value Ckmax or lower.

The value of the counter C becomes extremely larger when the similarity degree E is always larger than the threshold value Ec with the vehicle running only on the known road because the value of the counter C is added when the similarity degree E is larger than the threshold value Ec. When the value of the counter C is extremely large, a longer time is taken until the value of the counter C becomes lower than the counter Ck and longer time is taken before the correction of the present position is prohibited with the similarity degree E being lower than the threshold value Ec for the first time when the vehicle runs on the unknown road. Therefore, the upper limit value Ckmax is provided on the value of the counter C to prohibit it from exceeding the upper limit value Clmax.

At step a13, the present position is corrected. Namely, the corrected present position of the measured present position p1 is set as the correcting candidate point h on the link An. The corrected present position of the measured present position p1 is determined. Subsequently, the navigation apparatus 101 carries out the navigation in accordance with the corrected present position. When the corrected present position is determined, step a13 returns to step a3 to correct the present position in accordance with the present position measured next. The operation from steps a6 to step a13 reacts to the positional correcting means. Step a6 reacts to the similarity degree judging means and reacts, from step a6A to step a12, to the section measuring means.

When the peripheral link of the correcting candidate to be corrected in the measured present position is detected by plural as described above, the similarity degree calculation is effected with respect to each of the peripheral links is effected and the frequency where the similarity degree E is larger than the threshold value Ec is counted by the counter. The correction is effected with respect to the link where the value of the accumulation similarity degree ΣE is maximum within the link where the value of each counter is allowed larger than the constant Ck.

The navigation apparatus 101 in the present embodiment corrects for a first time when a section, where the similarity degree E becomes more than the predetermined threshold value Ec or more, becomes more than the predetermined time. Thus, the present position is prevented from being corrected into the known road by mistake while the vehicle is running on the unknown road.

When the similarity degree E exceeds the predetermined threshold value Ec in the above described flow chart, 1 is added to the counter C to count the frequency for judging the existence of the correction. The correction of the present position may be carried out when the lapse time obtained by the accumulating addition of time when the similarity degree E exceeds the predetermined threshold value Ec. The running distance, instead of the elapsed time, may be made the judging reference. The correction of the present position may be allowed when the accumulated addition result of the moving distance is the predetermined distance or more by addition, into the counter C, of the moving distance along which the vehicle runs per time T when the similarity degree E exceeds the predetermined threshold value Ec in the above described flow chart.

Figure 7:
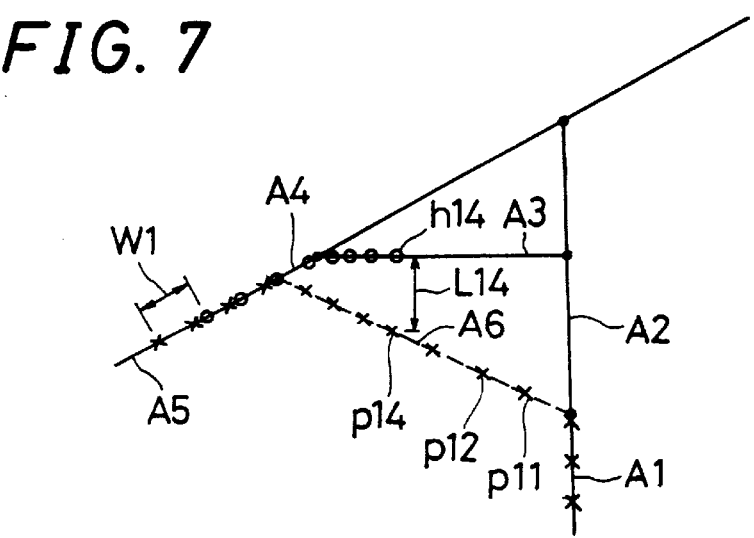
FIG. 7 is a diagram for illustrating the measuring present position to be measured and the correcting candidate points in running on the unknown road in the navigation apparatus 101 in the present embodiment.

Suppose that the known road and an unknown link A6 composed by subsequent connection of known links A1 through A5 exist as shown in, for example, FIG. 7. In the unknown link A6, one end is connected to a node between the known links A1 and A2, and the other end is connected to a node between the known links A4 and A5. The road bearing of the unknown link A6 is similar to the known link A3 and the other end of the link A6 approaches the known link A3. The vehicle is adapted to pass in the order of the links A1, A6, A5. The measured present position is shown with "X".

For example, when the vehicle runs on the portion near the one end of the link A6, the known link nearest to measured present positions p11, p12 or the like is a link A2. The road bearings of the link A2 and the link A6 are largely different and the running directions of the vehicle in the link A2 and the link A6 are largely different. Therefore, the similarity degree E with respect to the link A2 does not become a threshold value Ec or more. Also, the known link which is smallest in the bearing difference $\Delta\theta$ is the link A3. The similarity degree E does not become the threshold value Ec or more, because the distance L between the link A3 and the measured present position p11 is large. Therefore, the measured present positions p11, p12 are not corrected at this time.

The known link nearest to a measured present position p14 is the link A3 when the vehicle runs on the portion near the other end of the link A6. As the link A3 has the road bearing similar to the link A6, the running track is similar and the similarity degree E becomes larger. Allow the positional correction to be effected with only the similarity degree E as reference at this time, and the calculated present position p14 is corrected to a corrected candidate point h14 despite an actual running on the unknown link A6.

The measured present position and progress bearing of the vehicle are sometimes obtained relatively as described above. Suppose that the newest measured present position is estimated from the turning direction of the vehicle which is measured, for example, with a gyrocompass and from the running distance which is measured by the vehicle speed sensor. The newest measured present position is obtained by the addition to the new measurement from the previous measurement and the new measurement towards the turning direction where the previous correcting present position is measured. When the corrected present position is mistaken at this time, the errors are accumulated in the subsequent measured present positions to increase the errors.

Namely, the measured present position obtained by measurement following the correction of the measured present position p14 has, as reference, the corrected candidate point h14 deviated by a distance L14 from the actual position of the vehicle. Therefore, a subsequent measured present position is judged to be near the link A3 and is corrected to be "0" on the link A3. When the vehicle runs on the link A5, the position of the actual vehicle and the measured present position are deviated by slide W1 in correct result.

The navigation apparatus 101 in the present embodiment allows the correction of the present position only when the similarity degree E is continuously over the threshold value Ec. Suppose that the position correction judging constant Ck is set to a numeral, or more, to correspond to the time required for the vehicle to pass from the measured present position p14 to the other end of the link A6, the positional correction is not carried out before the vehicle passes the link A6. When the vehicle starts to run on the link A5, the similarity degree E exceeds the threshold value Ec again to allow the correction. In a case where the correction is allowed only when the similarity degree exceeds the threshold value continuously, the errors from conversely increasing due to the correction of the measured present position can be prevented.

Also, the invention is characterized in that the position correcting means of the invention includes:

similarity degree judging means for responding to the outputs of the similarity degree calculating means to judge whether or not the calculated similarity degree is a predetermined value or more;

section measuring means for responding to the outputs of the similarity degree judging means to measure the section length elapsed during a continuous judgment when the similarity degree is a predetermined value or more, and that the present position of the vehicle is corrected into the retrieved road portion when the section length measured becomes the predetermined length or more.

According to the invention, the position correcting means judges whether or not the similarity degree calculated by the similarity degree calculating means is the predetermined threshold value or more by the similarity degree judging means. When the similarity degree is the threshold value or more, the section measuring means measures the section length where the similarity degree is continuously the threshold value or more in the section from the first judgment, judged to be threshold value or more in the similarity degree, to the new judgment. The present position of the vehicle is corrected on the retrieved road portion when the section length measured is the predetermined length or more.

The predetermined length is set to be equal to the length of a road which is easy to be mistaken by the navigation apparatus. The unknown road often has at least one end portion connected with either of the known roads. When the unknown road is connected with the known road at a shallow angle, the present position of the vehicle running on the unknown road approaches the known road near the intersection point. When the vehicle runs on the unknown road in such a location, the navigation apparatus is likely to mistake that the vehicle runs on the known road. It is likely mistaken that the vehicle is running on the known road also when the vehicle is running on a curved portion with the unknown road being curved and is close to the known road.

The position corresponding means corrects the present position into the road portion for a first time when the similarity degree is the threshold value or more continuously for the predetermined section. Accordingly, the similarity degree with respect to the known road increases only while the vehicle is passing the curved portion when the unknown road is curved and is close to the known road. By setting the predetermined section to be more than the section where such similarity degree increases, the correction of the present position is not carried out even when the similarity degree has increased in the curved portion. The correction can be prevented into the known road through mistaking of the road during the running on the curved portion of the known road. Also, when the unknown road is connected with the known road with a shallow angle, the similarity degree with respect to the known road increases near the intersection points of these roads. By setting that the predetermined section is more than a section from the position where the similarity degree exceeds the threshold value to the intersection, and the present position of the vehicle running on the unknown road can be prevented from being corrected into the known road. The judgment is easier to effect when the judgment is carried out with the use of the section length where the similarity degree is continuous.

Also, according to the invention, the position correcting means corrects the present position of the vehicle into the retrieved road portion when the length of the section where the similarity degree is more than the threshold value or more is the predetermined length or more. The section length is set that, for example, the length of the section where the unknown road is curved and approaches to the known road, the length of the section near the intersection points between the unknown road and the known road, and so on may remove the locations where the navigation apparatus mistakes the road the vehicle runs on. Therefore, the error recognition of the roads can be prevented without fail.

Also, the invention is characterized in that the section measuring means responds to the outputs of the similarity degree judging means, when the similarity degree is the predetermined value or more, to accumulate and add to the section length the length of the section passed from the previous judgment to the new judgment, and to subtract from the accumulated and added results of the section length the length of the section passed from the previous judgment to the new judgment when the similarity degree is the predetermined value or lower.

According to the invention, the section measuring means accumulates and adds to the section length the length of the section passed from the previous judgment to the new judgment when the similarity degree is the predetermined threshold value or more. When the similarity degree is the threshold value or more at least twice, the section measuring means starts its measuring of the section length. The accumulated adding results of the section length of the section between the continuous two judgments are regarded as the section length of the continuous section where the similarity degree is the predetermined threshold value or more. Also, the accumulated adding results may be subtracted when the accumulated adding results exceed the predetermined value so that the accumulated adding results may not be increased without limit.

The precise errors which are caused by the simplification of the road data are included in the road bearing of the road portion used for the calculation of the similarity degree. Also, the detection errors in each detecting means are included in the present position and the progress bearing of the vehicle. The detection errors in the present position and the progress of the vehicle especially become sometimes larger depending on the construction of each detecting means. For example, the GPS for measuring the present position of the vehicle effects triangular surveying with the use of a plurality of positioning satellites. Each positioning satellite rarely approaches, apparently in its position to make the measuring errors larger, because the positioning satellites orbit around the earth. The value of the similarity degree which is to retain the same level as that of the similarity degree obtained at the measuring timing before and after the new measuring timing is sometimes lowered temporarily when the measured errors or the like become larger temporarily like this. Also, the detecting means is an electric appliance such as sensor or the like, and the detection results are often given as the electric signals. These electric signals are sometimes inferior because of external noises which are added. At this time, the errors are increased to lower the similarity degree.

The section measuring means subtracts the length of the section passed from the previous judgment to the new judgment from the accumulated adding results of the section length when the similarity degree is the threshold value or lower. Namely, it is assumed that the similarity degree is retained no more at the threshold value or more when the section where the similarity degree has decreased continues for a predetermined section. Therefore, it is not regarded that the similarity degree has been reduced at this time point even when such temporary similarity degree as before is reduced. The continuity of the similarity degree can be prevented from being damaged because the similarity degree is reduced temporarily due to the deterioration of the detection conditions continuous and the external noises.

Also, according to the invention, the length of the section elapsed from the previous judgment to the new judging is accumulated and added to the section length when the similarity degree is judged to be the predetermined threshold value or more. The length of the section elapsed from the previous judgment to the new judgment is subtracted from the accumulated adding results of the section length when the similarity degree is judged to be the threshold value or lower. The similarity degree is reduced temporarily by the deterioration of the detection conditions and the external noises to prevent the continuity of the similarity degree from being damaged.

Also, the invention is characterized in that the present position of the vehicle is corrected into the retrieved road portion when the similarity degree is larger than the predetermined continuously while the predetermined time passes.

According to the invention, the above-described predetermined section is measured as the continuous time when the calculated similarity degree becomes the threshold value or more. For example, the correction of the present position is effected every other predetermined time. The time where the similarity degree is continuously the threshold value or more can be easily calculated from the frequency by the counting of the frequency for judging where the similarity degree calculated by the above described judging means is the threshold value or more.

Accordingly it is easier to measure the section. Also, according to the invention, the section where the similarity degree is the predetermined threshold value or more is calculated as the continuous time where the calculated similarity degree is the threshold value or more. The continuous time can be easily measured by a method of calculating the frequency where the similarity degree is judged to be the threshold value or more. Also, the construction of measuring the time often is already included in the apparatus for the timing of correcting the present position. Therefore, it is not necessary to add the new construction for measuring the section.

Also, the invention is characterized in that the position correcting means corrects the present position of the vehicle into the retrieved road portion when the similarity degree is the predetermined value or more continuously while the vehicle passes the predetermined distance.

According to the invention, the above described predetermined section is calculated as the continuous distance where the calculated similarity degree becomes the threshold value or more. The vehicle sometimes runs at different speeds on the same road. The continuity of the similarity degree is independent of the speed of the vehicle when the vehicle runs for a section where the unknown road and the known road are likely mistaken with the predetermined section being set as distance. Therefore, the section is easier to set.

Also, according to the invention, the section where the similarity degree is the predetermined threshold value or more is calculated as the continuous distance where the calculated similarity degree becomes the threshold value or more. The section length can be measured without fail where the unknown road and the known road are likely mistaken and can be calculated in spite of the speed the vehicle runs at.

Figure 8:
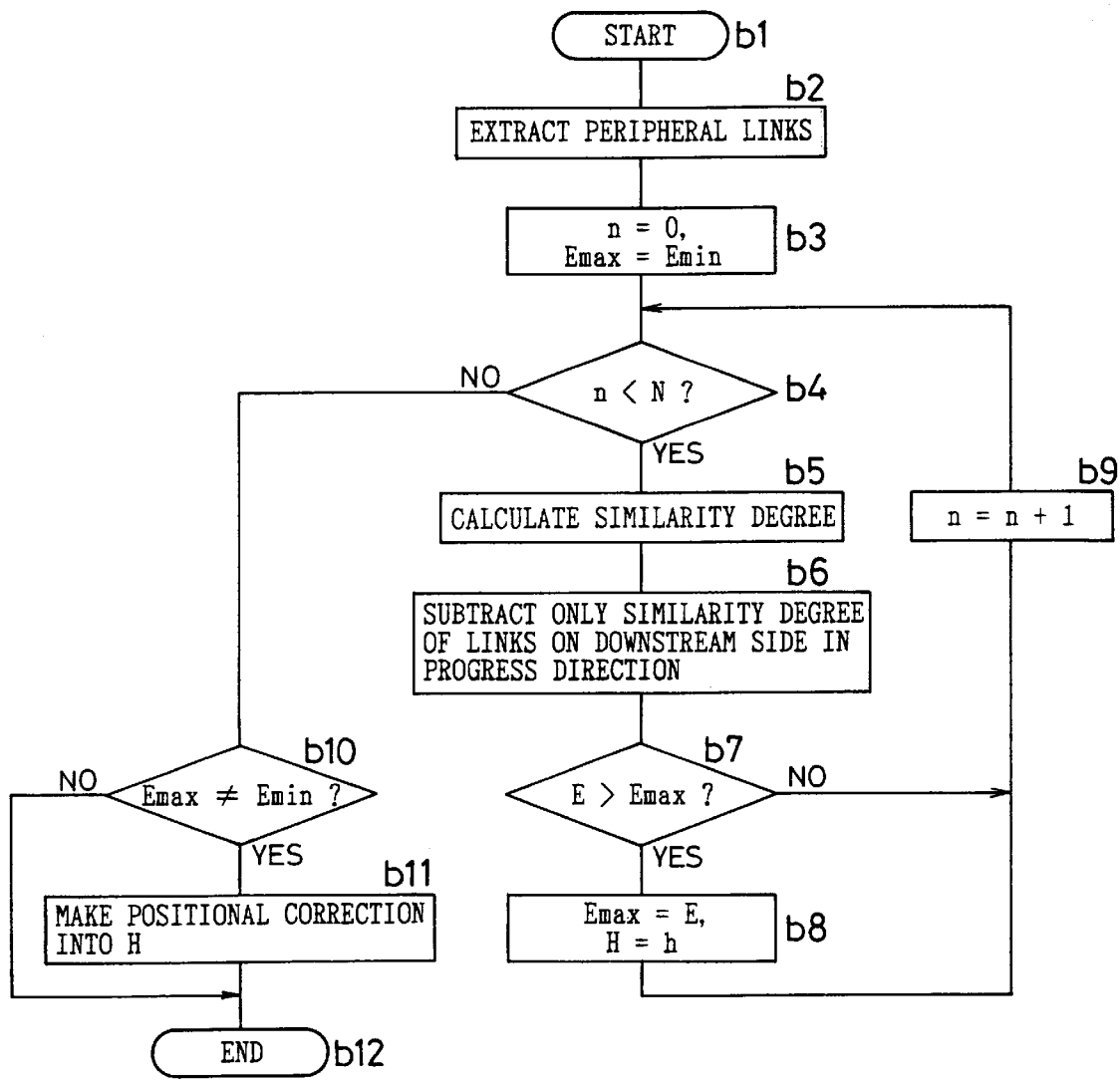
FIG. 8 is a flow chart for illustrating the match processing which is effected in the map match processing portion 104 of FIG. 1 and FIG. 2 as another embodiment of the invention.

FIG. 8 is a flow chart for illustrating the match processing which is performed in the map match processing portion 104 of FIG. 1 and FIG. 2 as another embodiment of the invention. The match processing corrects the measured present position of the vehicle on the road when the running track is similar to the road shape in the comparison between the running history of the predetermined vehicle and the road data. The match processing calculates the similarity degree with respect to the road on the assumption that the vehicle is running on the road to correct the vehicle position with the similarity degree with judgment reference. The match processing is carried out every time the present position is measured. When the newest measured present position of the vehicle is measured, step bi advances to step b2. At step b2, the road data about the road near the nearest calculated present position is read out from the memory apparatus 105 to extract the peripheral link as a correction object.

The extraction of the peripheral road is carried out by the following method. The first method is used, for example, when the measuring of the present position of the vehicle is carried out for a first time, and when the measured present position has been measured again after the measured present position was not corrected as correction is impossible to effect in the measured present position. A case where the correction is impossible to effect in the measured present position is when the measured present position is largely deviated from the data of the road recorded in the measured present position due to a fact that the vehicle runs on a road other than one recorded in the recording medium 119. In the first method, all the links are extracted including those within the predetermined range around the positional coordinates of the measured present position of the vehicle to make these links peripheral links as all the correcting objects. The predetermined range is a circular interior of several hundreds m in radius.

Also, a second method is used when the correction of the measured present position has been effected after the measured present position was corrected at least once. In the second method only a link to be connected with the nodes of both the ends of the link where the corrected present position exists is extracted, which link is included within a predetermined range in which the past corrected present position which is the correction result of the previous measured present position is used as a reference. These extracted links are made peripheral links as correction objects. The predetermined range is a range as far away as a position by value several times the maximum distance the vehicle can run for during the measurement from the previous measurement to the new measurement at a running speed from the past corrected present position to the previous measured present position, and the route length is a portion (link) connected for several ten m. Such action reacts to the road retrieving means.

Figure 9:
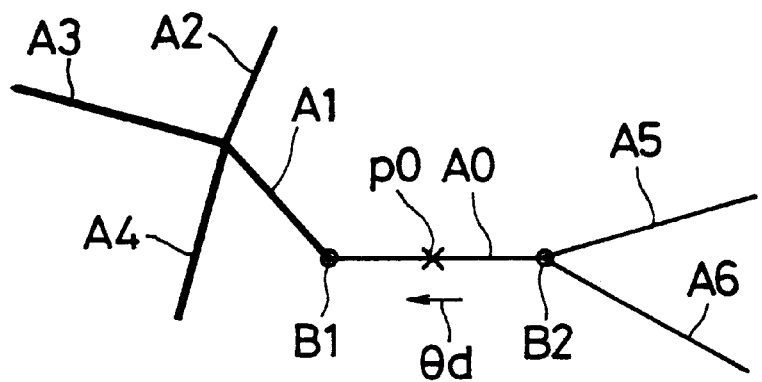
FIG. 9 is a diagram showing a link where the corrected present position exists and a link connected with the nodes of both the ends thereof, and a link on the downstream side.
Figure 10:
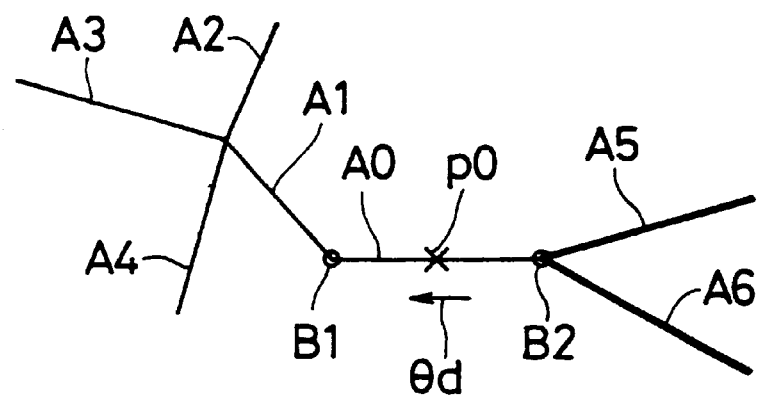
FIG. 10 is a diagram showing a link where the corrected present position exists and a link connected with the nodes of both the ends thereof, and a link on the upstream side.

FIG. 9 and FIG. 10 are drawings showing links where past corrected present positions exist and links where both nodes of both the ends are connected. A corrected present position p0 shown with "X" is a point on a link A0 and shows the vehicle stayed in the position at the measuring time of the previous present position. At this time, the vehicle is running in the running direction corresponding to the progress bearing θd showing the link A0 with an arrow. In the second method, the links extracted as the peripheral links as correction objects are links A1 through A6 which are connected with either of nodes B1, B2 of both the ends of the link A0. The link A1 is directly connected with the node B1 on the downstream side in the running direction corresponding to the progress bearing θd from between the nodes B1, B2 of the link A0. The links A2 through A4 are connected with the node B1 through the link A1. The links A5, A6 are directly connected with the node B2 on the upstream side in the running direction. The progress bearing θd is shown with absolute bearing with, for example, the north as 0 degree.

At this time, a map match processing portion 24 distinguishes the links A1 through A4 which are connected with the node B1 on the downstream side in the running direction of the link A0 and the link A5, A6 connected with the node B2 on the upstream side in the running direction of the link A0. Namely, the peripheral links as correction objects are distinguished in accordance with the progress bearing θd of the vehicle in the past corrected present position p0 measured, corrected.

A flag is added for distinguishing the links to set the flag value in accordance with the connected node when, for example, the road data corresponding to the extracted link is stored in the memory 117. "1" is substituted into, for example, the flags which are added to links A1 through A4 which are connected to the node B1 on the downstream side in the running direction. "0" is substituted into flags added to links A5, A6 which are connected with the node B2 on the upstream side in the running direction. Also, "1" is substituted into a flag which is added to the link A0, because the vehicle is sometimes running on the link A0 continuously. Such an operation reacts to the road distinguishing means.

When the links are extracted and distinguished in accordance with the progress bearing, the extracted results are stored in the memory 117. The number of the links extracted is set into a variable N when the results are stored. After the setting of the variable N is completed, step b2 advances to step b3.

At step b3, the initial setting of the similarity degree calculation is effected. The similarity degree E is a judging index for judging the highest link in the possibility where the vehicle is actually running from among the peripheral links as a plurality of correcting objects and is obtained respectively with respect to the plurality of peripheral links. The similarity degree E is larger as the possibility of running is higher. At step b3, 0 is substituted, for resetting, into the counter n for counting the link number completed in the similarity degree calculation. Also, the minimum value Emin of the similarity degree E, where the minimum value Emin is stored in the variable Emax for storing the maximum similarity degree, is the similarity degree when the vehicle runs on the road not recorded in the recording medium 119. After the initial setting is completed, step b3 advances to step b4.

At step b4, it is judged whether or not the value of a counter n is smaller than the variable N, namely, whether or not the similarity degree calculation has been completed with respect to all the links extracted. When the similarity degree calculation is not completed, the step advances to step b5.

At step b5, the similarity degree calculation is effected with respect to a link (hereinafter referred to ("Link An")) that has the same value as the value of the counter n in the order stored in the memory, from among the peripheral links. The similarity degree E is obtained by the following (2) equation:

$$E = F \times f + G \times g \qquad (2)$$

f is a bearing similarity degree, g is a distance similarity degree, and F and G are weight coefficients with respect to the bearing similarity degree and the distance similarity degree.

The bearing similarity degree f is determined as shown with solid line 141 of FIG. 5 in accordance with the bearing difference $\Delta\theta$ with respect to the progress bearing $\theta d$ of the vehicle in the past corrected present position. The bearing difference $\Delta\theta$ is an acute angle formed with a vector showing the road bearing $\theta D$ and the vector showing the progress bearing $\theta d$. The bearing similarity degree f is a maximum value fmax when the minimum is minimum, 0, in bearing difference $\Delta\theta$, becomes smaller linearly as the bearing difference $\Delta\theta$ becomes larger, thus resulting in 0, a minimum value, in the bearing difference $\Delta\theta 1$.

To obtain the bearing difference $\Delta\theta$, first, the progress bearing $\theta d$ is subtracted from the road bearing $\theta D$ to obtain the absolute value of the subtracted result ($\theta D - \theta d$). 180 degrees is subtracted from the absolute value $|\theta D - \theta d|$ when the obtained absolute value $|\theta D - \theta d|$ is over 180 degrees. The subtracted result is further subtracted from the 180 degrees when the subtracted result is over 90 degrees. Thus, the bearing difference $\Delta\theta$ can be obtained.

Figure 6:
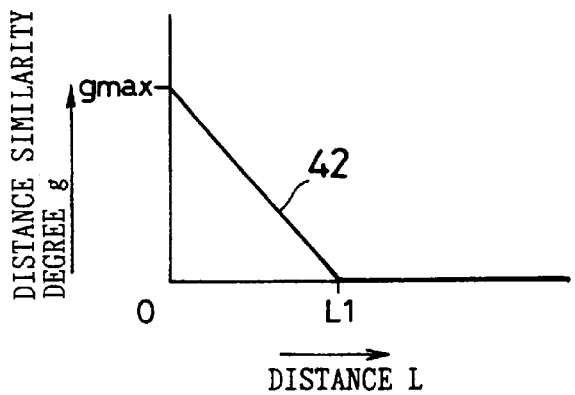
FIG. 6 is a graph showing the relationship between a distance similarity degree g and a distance L.

The distance similarity degree g is determined as shown with solid line 142 of FIG. 6, in accordance with the distance L between the new measured present position p1 shown in FIG. 4 and the link An. The distance similarity degree g is a maximum value gmax when the distance L is a maximum, 0, and becomes smaller linearly as the distance L becomes larger, and becomes 0, a maximum value in the distance L1.

The weight coefficients F, G are weighed respectively in the bearing similarity degree f and the distance similarity degree g. Namely, in the positional correcting by the match processing, it is determined whether the smaller bearing difference $\Delta\theta$ is weighed or the smaller distance L is weighed. The weight coefficients F, G are set to, for example, an equal value.

The similarity degree E is obtained in accordance with the bearing difference $\Delta\theta$ and the distance L with respect to each link An in this manner. When the similarity degree E is larger, the running track of the vehicle from the measuring of the past present position to the measuring of the newest present position is similar to the road shape of the link An. When the similarity degree E of the link An is calculated, step b5 advances to step b6. The operation from step b3 to step b5 reacts to the similarity degree calculating means.

At step b6, the similarity degree E of the link An calculated at step b5 is corrected in accordance with the positional relationship between the link An and the past link A0 to which the past corrected present position p0 belongs.

At first, it is judged whether or not a link An, a correcting candidate calculated in similarity degree is connected with either of the nodes B1, B2 of the past link A0. Namely, it is judged whether the link An exists on the upstream side or on the downstream side in the running direction corresponding to the progress bearing $\theta d$ of the past vehicle seen from the corrected present position p0 existing on the past link A0. It is necessary to reverse in the link A0 so as to run from the past corrected present position p0 to the link An when the link An is connected with the node B2 on the upstream side of the past link A0. When the link An is connected with the node B1 on the downstream side of the link A0, the vehicle can reach the link An, running without change in the running direction corresponding to the progress bearing $\theta d$ from the past corrected present position p0.

An operation to reverse on the same link by the vehicle is considered less in frequency with comparison with the running operation on the link only in one way direction. In the navigation apparatus 101 as the present embodiment, the calculation result of the similarity degree E of the link which is connected with the node B2 on the upstream side in the running direction is reduced, thereby judging whether or not the corrected candidate link An is connected with either of the node B1 on the downstream side in the running direction of the past link A0 or the node B2 on the upstream side in the running direction. The judgment about the connection of the link An is effected on the judgment whether the value of the flag set in step b1 is "0" or "1".

When the link An is judged to be connected with the node B2 on the upstream side in the running direction, a calculation result Ea of the similarity degree E calculated at step b5 is reduced in accordance with the following (3) equation:

$$E = Ea - Ec \qquad (3)$$

Ec is the predetermined subtraction constant. Also, the calculation result Ea of the similarity degree E may be reduced by the predetermined ratio portion of the calculation result Ea.

When the link An is judged to be connected with the node B1 on the downstream side in the running direction, the calculation result Ea of the similarity degree calculated at step b5 is outputted as it is as similarity degree E as shown in (4):

$$E = Ea \qquad (4)$$

The similarity degree of the link An which is connected with the node B2 on the upstream side in the running direction is corrected to be reduced more than the calculation result Ea of the similarity degree obtained with the use of the equation (1). Namely, the operation of the step b6 reacts to the similarity degree reducing means.

In the navigation apparatus of the conventional art, the probability where the measured present position p1 existed in the link An in spite of the progress bearing $\theta d$ of the wheel was considered the same when the relationship of the bearing difference $\Delta\theta$ and the distance L was same, and the similarity degree was equal in the new calculated present position p1 and the link An, or when the obtained similarity degree was equal although the relationship between the bearing difference $\Delta\theta$ and the distance L was different. In the above described case, it is judged whether or not the similarity degree is reduced when the link An is connected with the node B1 on the downstream side in the running direction of the vehicle and when connected with the node B2 on the upstream side in the running direction, in the present embodiment. Therefore, the similarity degree E after the correction of the link existing on the downstream side in the progress bearing $\theta d$ of the vehicle becomes larger than the similarity degree E after the correction of the like existing on the upstream side in seeing from the past corrected present position p0 when the link of the same similarity degree exist by plural. Accordingly, the probability where the measured present position p1 exists in the link An is considered larger when the link An exists on the downstream side in the running direction of the vehicle, instead of the existing on the upstream side in the running direction.

After the correction of the similarity degree is completed, step b6 advances to step b7. At step b7, the similarity degree E of the link An corrected at step b6 is judged whether or not the similarity degree E is larger than the value stored in the variable Emax for storing the maximum value of the similarity degree calculated as shown in the (5) equation:

$$E > Emax \qquad (5)$$

When the similarity degree E of the link An is larger than the value of variable Emax, the probability where the corrected present position of the new measured present position p1 exists in the link An is judged a maximum within the link completed in the calculation correction of the similarity degree E among all the peripheral links extracted at step b1. At this time, step b7 advances to step b8 to substitute the similarity degree E of the link An into the variable Emax to renew it. Also, in the link An, the position coordinates of the corrected candidate point h which are positioned nearest to the measured present position p1 are calculated to substitute the coordinates into a variable H to store it. After the renewing of the variables Emax, and H is completed, step b8 advances to step b9. Also, at step b7, the link, having the maximum probability where the correcting present position of the measured present position p1 exists, is judged to be a link other than the link An when the similarity degree E of the link An is a value of the variable Emax or lower. At this time, step b7 advances as it is to step b9.

At step b9, "1" is added to the counter n to renew it on the assumption where the calculation correction and corrected present position of the similarity degree E with respect to the link An has been completed in judgment. After the renewing of the counter n has been completed, step b9 returns to step b4 to effect the calculating correction and the judgment of the similarity degree E with respect to the link A (n+1) continuously. The operations of the calculation correction and the judgment of the similarity degree E with respect to each link an is repeated N times in this manner.

When the value of the counter n becomes the value of the variable N or more at step b4, the calculating correction and the judgment operation of the similarity degree E with respect to all the peripheral links are judged to have been finished at step b4. After the completion of the operation, it is judged that the variable H of the correcting candidate point h is judged to have been determined and step b4 advances to step b10. At step b10, it is judged whether or not the value of the variable Emax for storing the maximum value of the similarity degree E is equal.

The similarity degree becomes larger as the bearing difference $\Delta\theta$ between the past progress bearing $\theta d$ of the vehicle in the past measured present position p0 and the road bearing $\theta D$ of the link An which is the correcting candidate is smaller. The similarity degree E becomes smaller as the distance L between the newly measured present position p1 and the link An which is the correcting candidate is larger. Therefore, the similarity degree with respect to the link becomes smaller as the link for forming the road does not exist when the vehicle runs on the road not recorded in the road data recording medium 119. The probability where the corrected existing position of the measured present position p1 exists on the link becomes smaller as the similarity degree becomes smaller. The link which has the largest similarity degree among the similarity degrees calculated at step b4 through step b9 is different from the link on which the vehicle runs actually, and this is especially the case when the vehicle runs on the road not recorded in the recording medium. Therefore, the similarity degree with respect to the link is smaller than the similarity degree corrected in calculation with respect to the link on which the vehicle runs.

The present position is deviated from the actual position due to the position corrected when the corrected present position is set on the link where the vehicle does not run actually in the above described case. To prevent it, the present position is corrected only when the similarity degree is the predetermined value or more in the navigation apparatus 101 as the present embodiment. Namely, when the road bearing $\theta D$ is different with the similarity degree E being low and all the peripheral links being far from the measured present position p1, the correction of the present position is not effected because it is assumed that the vehicle does not run on the links. In the present embodiment, the similarity degree E becomes a minimum value Emin and does not become lower when at least the bearing difference $\Delta\theta$ is the difference $\Delta\theta 1$ or more, and the distance L is the distance L1 or more. Therefore, the correction of the present position is effected only when the bearing difference $\Delta\theta$ is larger than the minimum value Emin.

When the variable Emax is a value except for the minimum value Emin of the similarity degree E at step b10, the step advances to step b11. At step b11, the corrected present position of the measured present position p1 is set at the corrected candidate point h on the link A where the similarity degree E to be stored in the variable H is a maximum to correct the present position. Thus, the corrected present position of the measured present position p1, is determined. Subsequently, in the navigation apparatus 101, the navigation is carried out in accordance with the corrected present position. When the corrected present position is decided, step b11 advances to step b12 to complete the processing operation of the flow chart. Also, when the variable Emax is equal to the minimum value Emin of the similarity degree E, the present position is not corrected. Step b10 advances as it is to step b12 to complete the processing operation of the flow chart. The operations at step b10 and step b11 react to the position correcting means.

As described above, it is used whether or not the link exists in either of the stream side and downstream side in the running direction corresponding to the progress bearing $\theta d$ of the vehicle in addition to the bearing difference $\Delta\theta$, the distance L, as the calculation element of the similarity degree E with respect to the link. Thus, it can prevent the running track of the vehicle which is visually displayed on the display apparatus 106 of the navigation apparatus 101 in spite of running only in a one way direction by the correction of the present position. As the link on the upstream side is also judged by the similarity degree calculation, the running track also makes a U-turn and is reversed in accordance with the movements of the vehicle when the vehicle actually makes a U-turn and is reversed.

Figure 11:
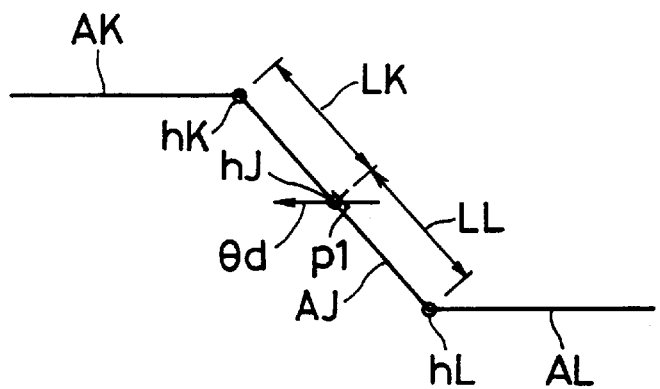
FIG. 11 is a diagram showing the positional relationship among links AL, AJ, AK and a measured present position p1 in the selection of the running track progressing in a one way direction in the present embodiment.

For example, as shown in FIG. 11, the vehicle runs the road composed of links AL, Ak whose road bearings $\theta D$ are parallel, and link AJ which is connected with one node of the links AL, AK in such a manner that the links AL, AJ, AK are passed in this order. At this time, the measured present position pl is regarded to have been measured as a point near the link AJ after the vehicle reached the link AJ with at least the corrected present position being set on the link AJ. At this time, assume that the past progress bearing $\theta d$ is parallel to the links AL, AK as shown with arrow mark. The candidate point shortest in distance from the measured present position p1 is a correcting candidate point hJ on the link AJ. Also, the correcting candidate point shortest in the bearing difference $\Delta\theta$ with respect to the progress bearing $\theta d$ is correcting candidate points hL, hK on the links AL, AK.

When the similarity degree E is calculated when the bearing difference Δθ is weighed more than the distance L, the weight coefficient F becomes larger than the weight coefficient G. At this time, the corrected present position is selected to either of the correcting candidates points hL, hK. In FIG. 11, distances LK, LL from the measured present position p1 to the correcting candidate points hL, hK is equal. Under the conditions, the similarity degree E with respect to the links AL, AK becomes equal in the navigation apparatus of the conventional art, and it is difficult to set the corrected present position by the selection of either of the correcting candidate points hL, hK. In the navigation apparatus 101 as the present embodiment, the link AK exists on the downstream side in the running direction corresponding to the progress bearing θd of the vehicle, and the link AL exists on the upstream side in the running direction. Therefore, the similarity degree E of the link AK is larger than the similarity degree E of the link AL. Thus, the corrected present position can easily become the correcting candidate point hK of the link AK.

Also, as shown in FIG. 12, assume that the road is composed of links AK, AJ, AK, is deviated slightly from the road bearing where the link AK is parallel to the link AL, and the progress bearing θd of the vehicle is parallel to the road bearing of the link A1. When the bearing difference Δθ is weighed and the similarity degree E is calculated, the corrected present position is set into the correcting candidate point hL of the link AL even if the distances LK, LL to the correcting candidate points hL, hK in the conventional navigation apparatus.

Also, assume that the distance LK to the correcting candidate point hK is slightly shorter than the distance LL to the correcting candidate point hL when the road is composed of the links AK, AJ, AK and the link AK is parallel to the link AL. When the bearing difference Δθ is weighed and the similarity degree E is calculated, the corrected present position is set to the correcting candidate point hL of the link AL even when the bearing difference Δθ is equal with respect to the links AL, AK in the conventional navigation apparatus.

Because of change only in the distance L and the bearing difference Δθ with the measured present position and the progress bearing approaching the link AL in the conventional navigation apparatus, the running track of the vehicle visually displayed on the navigation apparatus is reversed despite the vehicle running in one way direction.

The similarity degree E is calculated considering the position of the link with respect to progress bearing in the navigation apparatus 101 as the present embodiment. As described above, the calculation is effected so that the similarity degree E of the link AK may become larger than the similarity degree E of the link AL when the bearing difference Δθ of the link AL is slightly shorter or the distance L is slightly shorter as compared with the link AK in the road composed of links AK, AJ, AK. The constant Ec, which is the reduction portion of the similarity degree when the link is on the upstream side in the running direction corresponding to the progress bearing θd of the vehicle, is set large enough to cancel the difference in the similarity degree which is caused by the difference in the slight amount of such distance L and bearing difference portion Δθ as shown in FIG. 12. The corrected present position can be made the correcting candidate point hK of the link AK even when such slight difference is caused. Therefore, the selection of the running track of making a U-turn to reverse it can be prevented.

FIG. 13 is a diagram showing the positional relation of the links AL, AJ, AK and the measured present position p1 when in the running track of reversing in the navigation apparatus 101 in the present embodiment. The road bearing of the links AL, AK is made parallel to each other at this time. Assume that the measured present position p1 extremely approaches to the link AL to make minimum the bearing difference Δθ between the progress bearing θd and the road bearing of the link AL. The distance LK from the measured present position p1 to the correcting candidate point hK of the link AK is much longer than the distance LL from the measured present position p1 to the correcting candidate point hL of the link AL. The distance difference of respective distances LK, LL is large enough to cancel the constant Ec which is the reduction portion of the similarity degree E of the upstream side link when it is converted into the similarity degree E.

When the similarity degree E is calculated with the bearing difference Δθ being weighed at this time, the similarity degree E of the link AL is larger than the similarity degree E of the link AK. Accordingly, the correcting candidate point hL of the link AL as the corrected present position, is selected. The running track is reversed.

In preventing the running track from being reversed by mistake when the present position is corrected, the similarity of the link is reduced, not that the reversing link is removed from the correcting object. The correcting operation can be effected without distinguishing between when the vehicle runs only in one direction and when the vehicle is U-turned and is reversed.

Further, the invention is characterized in that the map matching means includes:

road retrieving means for retrieving a road portion which is connected with the end portion of a road portion to which the past present position of the vehicle belongs, from the recorded road data;

road distinguishing means for responding to an output of the road retrieving means and distinguishing the retrieved road portion into the upstream side road portion, which is a direction reverse to the progress direction of the vehicle, and into the downstream side road portion which is a direction the same as the progress direction of the vehicle;

similarity degree calculating means for responding to an output of the road retrieving means and calculating a similarity degree between the road bearing for each road portion retrieved and the running history based on the present position and the progress direction of the vehicle, similarity degree reducing means for responding to outputs of the road distinguishing means and the similarity degree calculating means and outputting a similarity degree of the upstream side road portion after reducing and a similarity degree of the downstream side road portion as it is; and position correcting means for responding to an output of the similarity degree reducing means and correcting the present position of the vehicle on a correcting candidate point of a road portion having a largest similarity degree.

According to the present invention, the map matching means corrects the present position in accordance with the detected present position and progress bearing.

At first, in the road retrieving means, the road portion which is connected with the end portion of the road portion having the past estimating portion of the vehicle is retrieved from the road data. All the retrieved road positions become the candidates of the road portion to be corrected in the present position. The retrieved road portion distinguishes into the upstream side road portion which becomes a direction reverse to the progress direction of the vehicle and the downstream side road portion which becomes a direction the same as the progress direction of the vehicle.

With respect to the retrieved road portion, the similarity degree calculating means calculates individually the similarity degree between the road portion and the running history of the vehicle. The similarity degree is decided in accordance with the road bearing of the road portion which becomes a calculation object, the present position of the vehicle and the progress bearing of the vehicle. The similarity degree between the running history of the vehicle and the road portion is made numerical. The similarity degree is higher as the value is larger. The calculated similarity degree is outputted to the position correcting means through the similarity degree reducing means. In the similarity degree reducing means, only the similarity degree of the upstream side road portion is reduced and is outputted. The similarity degree of the downstream side road portion is outputted as it is.

In the position correcting means, the road portion to correct the present position from a plurality of road portions is determined in accordance with the similarity degree calculated and reduced. At this time, the position correcting means decides the road portion for correcting the road portion largest in the similarity degree to set the correction position corrected in the present position onto the road portion.

The similarity degree with respect to a plurality of road portions is respectively calculated to subtract by the similarity degree with respect to the upstream side road portion. The degree where the upstream side road portion is not selected, with the downstream side road portion being preferential, is converted into similarity degree and the similarity degree of the road portion not preferential is reduced by the conversion portion. Also, the degree where the downstream side road portion is preferential is converted into the value of the similarity degree so that the similarity degree of the road portion to be privileged may be increased by the conversion portion. The judging index as to whether or not the road portion is selected with priority is made numerical and is handled equally as the other selecting judgment index for the selection of the road to be corrected. It becomes easier to select the road portion with a plurality of judging indexes being added in parallel.

Also, according to the present invention, in the map matching means, the similarity between the running history of the vehicle and the road portion is made numeral for judgment. Information showing whether the road portion exists on the downstream side or the upstream side in the progress direction of the vehicle is converted into similarity degree, made numeral, and is treated as in the other selecting elements quantitatively. Thus, the road portion becomes easier to select by a weighing of the plurality of selection judging indexes in parallel. Accordingly, it becomes easier to add the selection judging index newly added.

The invention is characterized in that the road distinguishing means distinguishes a plurality of road portions which are connected with both the ends of the road portion to which the past corrected present position of the vehicle belongs into upstream side road portions composed of road portions which are connected with the end on the upstream side in the progress direction of the vehicle and downstream side road portions composed of road portions which are connected with the end of the upstream side in the progress direction of the vehicle.

According to the invention, the road distinguishing means distinguishes the road portions as correcting objects between the upstream side road portion and the downstream side road portion with the past road portion having the past corrected present position of the vehicle as a reference. The road portions which become correcting objects become a plurality of road portions connected respectively with both the end portions of the past road portion. All the road portions which are connected with the end portion on the upstream side in the progress direction of the vehicle from among the road portions are regarded as the road portions on the upstream side. Also, the road portions which are connected with the end portion on the downstream side in the progress direction of the vehicle are all regarded as the downstream side road portions.

The road portions which are connected with the upstream side end portion of the past road portion are regarded as the road portions to be corrected. When a plurality of road portions are connected with the upstream side end portions, the road portion already passed once are regarded as one of these road portions. To reach the present position corrected on one road portion connected with the upstream side end portion from the present position corrected in the past, at least one portion of the past road portion, the portion from the past corrected present position to the upstream side end portion, is reversed. Accordingly, when the present position is corrected into the road portion connected with the upstream side end portion even if the road is the road portion not passed so far, one portion of at least past road portion is reversed. Therefore, regard that all the road portions connected with the upstream side end portion as the upstream side road portions, and it is possible to be arranged that the road portion capable of reversing cannot be selected with priority.

Also, according to the invention, the road distinguishing means has the past road portion as a reference to which the past corrected present position of the past belongs. The road portion which is the end portion of the past road portion and which is connected with the end portion on the upstream side in the progress bearing of the vehicle, is all regarded as the upstream side road portion and is reduced in similarity degree. The road portion capable of reversing without failure can be provided not to be selected with priority. The distinguishing operation is easier to effect because the judging only has to be made as to whether or not one end portion of the respective road portions is connected with either end portion of the past road portion.

FIG. 14 is a flow chart for illustrating the position detecting operation which is effected in the map match processing portion 114 of the navigation apparatus 101 in still another embodiment of the present invention. In the navigation apparatus 101, the present position of the vehicle, measured in the position bearing measuring portion 103, is corrected by match processing in the map match processing portion 104. The match processing corrects onto the road the measured present position of the vehicle when the running track is similar to the road shape within a constant range through the comparison between the running history memorized in advance and the road data. In the match processing, the similarity degree with respect to the road is calculated on the assumption that the vehicle is running on the road to select the road for correcting the vehicle position with the similarity degree as the judging index. The match processing is carried out each time the measured present position is measured.

When the newest measured present position of the vehicle is measured, step c1 advances to step c2. At step c2, the road data about the road near the newest measured present position is read out from the memorizing apparatus 105 to extract the peripheral link which becomes a correcting object.

The retrieving of the peripheral links is carried out by the following method. The first method is used when the measuring of the present position of the vehicle is a first time, and when the measured present position has been measured again after the correcting of the measured present position was not effected as being incapable of correction. The measured present position is out of shape largely from the data of the road recorded in the measured present position because the vehicle is running on the road except for the road recorded in the recording medium 119 when the measured present position is impossible to correct. In the first method, all the links included in the predetermined range around the position coordinates of the measured present position of the vehicle are extracted. The predetermined range is, for example, a circular interior portion of several m in radius.

Also, the second method is used when the measured present position has been measured continuously after at least once the measured present position was corrected. In the second method, links included within the predetermined route length with the past corrected present position which is the corrected result of the new measured present position as a reference, links where the corrected present position exists, and the links where the nodes of both the ends are connected, are extracted. In the predetermined range is a range to a position as far as the value several times the maximum distance capable of running from the past corrected present position to the new measurement from the previous measuring at the running speed in the previous measured present position, and, for example, a portion (link) connected in several tens m in route length.

The link extracted by such a method is made a peripheral link to which the correcting candidate point of the corrected objects belongs. Extract the link and the extract result is stored in the memory 117. When the extraction of the link is completed, step c2 advances to step c3. At step c3, correcting candidate points hl through hN are set. The correcting candidate point is a point on the peripheral link extracted, and a point for satisfying conditions described below. At step c2, the operation reacts to the operation as the road retrieving means.

As shown in FIG. 15, assume that the road where extracted links A11, A12 as peripheral links are connected in a node B11 connected in construction runs like passing in the order the vehicle runs on the links All, A12. With the node B11 as boundary, a road bearing $\theta D11$ of the link All and a road bearing $\theta D12$ of the link A12 are different. The past corrected present position p0 which is the corrected result of the measured present position measured in the past position detecting operation that is the position detecting operation before the newest position detecting operation belongs to the link All. The newest measured present position p1 exists in the direction of the progress bearing Od direction from the past corrected present position p0 and does not belong to either of the links A11, A12.

Assume that the present position is a relative position by the vehicle speed sensor and the gyrocompass as the first position detecting means, and is estimated as the first present position running for only the newest running distance into the newest progress bearing measured from the corrected present position p0 measured and corrected in the past. The running distance which is used for obtaining the relative position is obtained from the number of pulses outputted each time the wheel is rotated by the predetermined revolution angle with the use of the vehicle speed sensor. The vehicle wheels may be slipped when the road at this time is a gravel road or a snowy road. Errors are caused in the running distance accordingly when the wheels slip so that the number of the pulses and the running distance of the vehicle are put out of proportion.

Also, the progress bearing is obtained by a measuring of the turning amount of the vehicle with the use of the gyrocompass to add the turning amount to the past progress bearing. The gyrocompass sometimes changes, as time passes, in characteristics such as offset of the output signal by the temperature changes. Thus, the progress bearing becomes inaccurate and the measured present position sometimes becomes inaccurate accordingly.

Further, as the road data which become a reference for correcting the preset position are simplified as described above, it is difficult to obtain the deviation of the distance caused by the width, the grade of the road, and so on. When the vehicle on the road is turned to right or to left at the intersection point, the running distance of the wheel from the intersection point approaching position to the intersection point passing position is different by the running track of the vehicle from the intersection point approaching time to the passing time. Especially on the wide road, the running distance is made different by passing different positions in the wide direction of the road at the intersecting point approaching time and the passing time. When the data about the road width of the road is simplified, it is difficult to understand the running distance considering the different running track.

When the relative position of the measured present point is obtained with the use of such data, the present position where the vehicle actually exists is deviated from the measured present position pl. Especially when the running distance is different, the actual present position and the measured present position p1 are deviated in a direction along the progress direction of the wheel.

The correcting candidates hi, h2 are respectively set on, for example, the links A11, A12. The correcting candidate point hi is shortest in the distance L with respect to the newest measured present position p1 within the links A11, A12. The correcting candidate point h2 is set on the link A12, which is the shortest in the bearing difference $\Delta\theta$ between the progress bearing $\theta d$ and the road bearing $\theta D$ and is shortest in the distance L with respect to the newest measured present position p1 on the link. The distance L and the bearing difference $\Delta\theta$ are parameters for obtaining the similarity degree described below.

FIG. 16 is a view showing the positional relationship between an optional peripheral link A and the measured present position p1. The bearing difference $\Delta\theta$ is an acute angle formed by a vector showing the road bearing $\theta D$ of the peripheral link A and a vector showing the progress bearing $\theta d$. To obtain the bearing difference $\Delta\theta$, the progress bearing $\theta d$ is subtracted from the road bearing $\theta D$ to obtain the absolute value of the subtracted result ($\theta D - \theta d$). When the obtained absolute value $|\theta D - \theta d|$ is over 180 degrees, 180 degrees is subtracted from the absolute value $|\theta D - \theta d|$. Further, when the subtracted result is over 90 degrees, the subtraction result is further subtracted from 180 degrees. Thus, the bearing difference $\Delta\theta$ can be obtained. Also, the distance L is the shortest distance between the measured present position p1 and the peripheral link A.

The measured present position p1 is corrected into such correcting candidate points h1, h2, and it is considered that the similarity degree with respect to each connecting candidate point h1, h2 becomes almost equal. With the parameter for obtaining similarity degree as a reference, the correcting candidate point is set on the link which is estimated to be almost equal in similarity.

For example, the map match processing portion 104 has the allowable range of the value of the distance L and the bearing difference Δθ set in advance. When a plurality of peripheral links are obtained, the distance L and the bearing difference Δθ to the measured present portion p1 with respect to each peripheral link are obtained to judge whether or not the values are included respectively in the allowable range of the distance L and the bearing difference Δθ. When they are included in it, the correcting candidate point is set on the link. The deviation of the correcting candidate points h1, h2 is considered to be caused by the above described running distance and so on.

Also, when the position and bearing measuring portion 103 is provided with a plurality of means for measuring the measured present position, the correcting candidate point is set as described hereinafter. When a position and bearing measuring portion 13 is provided all with the sensors 111, 112 and the GPS receiver 113 as the second position detecting means, an absolute position p1a and a relative position p1b which are the second present position of the measured present position p1 can be respectively measured. And the absolute bearing θda and the relative bearing θdb of the running bearing θd of the vehicle can be also measured respectively.

An absolute position p1a and the relative position p1b are sometimes different as shown in FIG. 16. Also, an absolute bearing θda and the relative bearing θdb are sometimes also different, as shown in FIG. 16. Also, the deviation is caused due to errors included in the bearings θda, θdb and positions p1a, p1b. For example, in the GPS receiver 113 for measuring the absolute position, signals outputted respectively from the plurality of positioning satellites 115 are received to effect a triangular surveying operation with the use of the signals. At this time, when the position of each positioning satellite 115 is apparently approached, the measuring errors become larger. Also, even when the number of the positioning satellite 115 capable of receiving the signals is limited, the measuring errors become larger. Also, the relative position p1b and the relative bearing θdb are sometimes deviated also from the actual position by the above described errors.

At this time, it is difficult to judge which is closer to the present position of the actual vehicle between the absolute position p1a and the absolute position p1b. Similarly, it is difficult to judge which is closer to the progress bearing of the actual vehicle between the absolute bearing θda and the relative bearing θdb. Therefore, at this time, the absolute position p1a and the absolute bearing θda are supposed to be the measured present position and the running bearing of the right vehicle to set the correcting candidate point h5 to be corrected in the absolute position p1a onto a link A14 which is one of the peripheral links. Similarly, assume that the relative position p1b and the relative bearing θdb are the measured present position and the running bearing of the correct vehicle, and the correcting candidate point h4 to be corrected in the absolute position p1b is set on the link A14 which is one of the peripheral links.

Assume to have the absolute position p1a and the relative position p1b as a reference in this manner, and plural settings of the correcting candidate points can be performed independently of the road shape. A plurality of correcting candidate points can be set even in such a road, such as an expressway, where the number of linear lines is many and the single link is longer when such setting method is used.

The GPS receiver 113 receives the signals from the plurality of positioning satellites 115 in the orbit around the earth to effect the positioning measuring operation. Therefore, in a location such as a tunnel or the like where the signals from the positioning satellites 115 cannot be received, the receiver cannot be used. Also, when the electric field intensity of the reception signals is extremely weak, the errors become larger in the measurement result. Also, the errors of the measurement result become even larger when the number of the positioning satellites 115 capable of receiving the signals is fewer or when the positions of the plurality of positional satellite 115 for transmitting the signals are apparently approaching. Therefore, it is difficult to measure the absolute position p1a all the time with the use of the GPS receiver 113. When the correcting candidate point h5 is obtained, it is sufficient to obtain only the absolute position p1a and the absolute bearing θda the measuring operation of a single time. Therefore, the operation of setting the correcting candidate point h5 with the use of the absolute position p1a can be effected only when the GPS receiver 113 can be used.

Also, when the vehicle does not pass the inflection points, and when it is impossible for the GPS receiver 113 to be used, the next correcting candidate point is set with the use of the correcting candidate point already set. For example, assume that the correcting candidate points h1, h2 shown in FIG. 15 are set in the previous correcting operation. In the correcting operation which is performed following the correction operation, the new correcting position is set on the link which is minimum in the bearing difference Δθ with the distance L with respect to the measured present position being shortest, assuming that the positions running by the newest progress distances towards the newest progress bearings from the correcting candidate points h1, h2 are respectively the measured present positions. At step c3, the operation reacts to the operation as the candidate point setting means.

When a plurality of correcting candidate points are set, the number of the correcting candidate points is set to a variable N. When the correcting candidate points hi through hN are set, step c3 advances to step c4. At step c4, the initial setting of the similarity degree calculation is effected. The similarity degree is a judging index for judging the link highest in possibility where the vehicle is actually running from among the peripheral links to which a plurality of correcting candidate points belong and is obtained respectively with respect to links to which the correcting candidate points hi through hN belong.

At step c4, 0 is substituted into the counter n for counting the number of the links where the similarity degree calculation has been completed. Also, the minimum value Emin of the similarity degree E is stored into the maximum accumulation ΣEmax which is a variable for storing the maximum accumulation result of the similarity degree. The minimum value Emin of the similarity degree E is a similarity degree when the vehicle runs on the road not recorded in the recording medium 119. When the initial setting has been completed, step c4 advances to step c5.

At step c5, it is judged whether or not the value of the counter n is smaller than the variable N, namely, the similarity degree calculation has been completed with respect to each link to which the extracted all the candidate points h1 through hN. When the setting has not been completed, the step advances to step c6.

At step c6, the similarity degree calculation is effected with respect to the link (hereinafter referred to as "link An") to which the correcting candidate point belong (hereinafter referred to as "correcting candidate point hn") which is the same as the value of the counter in the order stored in the memory among the correcting candidate points h1 through hN. The similarity degree E is obtained by the following (6) equation:

$$E = F \times f + G \times g \tag{6}$$

f is a bearing similarity degree, g is a distance similarity degree. F and G are weight coefficients with respect to the bearing similarity degree and the distance similarity degree.

The bearing similarity degree f is determined as shown with solid line 141 of FIG. 5 in accordance with the bearing difference portion $\Delta\theta$. The bearing similarity degree f is a maximum fmax when the bearing difference $\Delta\theta$ is 0, a minimum, and becomes smaller linearly as the bearing difference portion $\Delta\theta$ becomes larger, thus resulting in 0, a minimum value, in the bearing difference $\Delta\theta1$. The distance similarity degree g is determined, as shown with solid line 142 of FIG. 6, in accordance with the distance L. The distance similarity degree g is a maximum value gmax when the distance L is 0, a minimum, and becomes smaller linearly as the distance L becomes larger, and becomes 0, a minimum value in the distance L1.

The weight coefficients F, G are weighed respectively on the bearing similarity degree f and the distance similarity degree g. Namely, in the positional correcting by the match processing, it is determined whether the smaller bearing difference $\Delta\theta$ is weighed or the smaller distance is weighed. The weight coefficients F, G are set to equal values.

In this manner, the similarity degree E is obtained in accordance with the bearing difference $\Delta\theta$ and the distance L with respect to a link An to which the correcting candidate point hn belongs. When the similarity degree E is larger, the running track of the vehicle from the measuring of the past present position to the measuring of the newest present position is similar to the road shape of the link An. When the similarity degree E with respect to the link An is calculated, step c6 advances to step c7. At step c6, the operation reacts to the operation as the similarity degree calculating means.

At step c7, the accumulation similarity degree $\Sigma En$ of the correcting candidate point hn is obtained. As shown in FIG. 15 and FIG. 16, the initial values of accumulation similarity degrees $\Sigma E1$, $\Sigma E2$, $\Sigma E4$, $\Sigma E5$ of each of the correcting candidate point h1, h2; h4, h5 are accumulation similarity degrees having the past corrected present position p0 when the correcting candidate point is newly set. Also, as described above, a first value of the accumulation similarity degree of the correcting candidate point hn is the accumulation similarity degree having the past correcting candidate point when the correcting candidate point hn is set in accordance with the past correcting candidate point. The similarity degree E with respect to the correcting candidate point hn set in the newest correcting operation is accumulated, and added to the these accumulation similarity degrees to obtain an accumulation similarity degree $\Sigma En$ of the correcting candidate point hn as shown in (7) equation.

$$\Sigma En = \Sigma En = E \tag{7}$$

As described later, the accumulation similarity degree $\Sigma En$ is used as a selection index for selecting the final present position. And in the next correcting operation, it is used as an index to judge whether or not the correcting candidate point is newly set in accordance with the correcting candidate point hn. The accumulation similarity degree $\Sigma En$ and the correcting candidate point hn are stored in the address related to, for example, the memory 117.

When the calculation of the accumulation similarity degree is completed, step c7 advances to step c8. At step c8, it is judged, as shown in equation (8), whether the accumulation similarity degree $\Sigma En$ of the correcting candidate point hn is larger than the value stored in the maximum accumulation $\Sigma Emax$ which is a variable for storing the maximum value of the accumulation similarity degree calculated:

$$\Sigma En > \Sigma Emax \tag{8}$$

When the accumulation similarity degree $\Sigma En$ of the correcting candidate point hn is larger than the value of the maximum accumulation $\Sigma Emax$, the probability that the correcting candidate point hn is the correcting present position of the newest measured present position p1 is judged to be maximum among the correcting candidate points where the calculation correction of the accumulation similarity degree $\Sigma En$, in all the peripheral link extracted at step c1, has been completed. At this time, step c8 advances to step c9. The accumulation similarity degree $\Sigma En$ of the correcting candidate point hn is substituted into the maximum accumulation $\Sigma Emax$ and is renewed. When the renewing of the maximum accumulation $\Sigma Emax$ is completed, the step advances to step c10 to substitute the corrected present position of the measured present position p1 into the optimum correcting candidate point h. Upon setting, step c10 advances to step c11. Also, at step c8, the correcting present position of the measured present position p1 is judged to be another correcting candidate point except of the correcting candidate point hn when the accumulation similarity degree $\Sigma En$ of the correcting candidate point hn is smaller than the value of the maximum accumulation $\Sigma Emax$. At this time, step c7 as it is advances to step c11.

The above described measuring errors are included in the measured present position p1. Also, the precision errors caused due to simplification in the road are included in the road data. By these errors, the value of the accumulation similarity degree $\Sigma E$ of the correcting candidate point, which should be best, actually is not sometimes a maximum among the accumulation similarity degrees of the correcting candidate points hi through hN. Therefore, the correcting candidate point is newly set in accordance with each correcting candidate point to accumulate the similarity degree in the position detecting operation after the positional detection operation when the plurality of correcting candidate points are set at a certain position detecting operation in the navigation apparatus 101 as the present embodiment. The accumulation similarity degree becomes larger as the correcting candidate points which are set sequentially in accordance with a certain correcting candidate point agrees more with the running track of the actual vehicle. Therefore, the value of the accumulation similarity degree EE becomes a maximum by repetition of the positional detection operation even when the maximum similarity degree E is temporarily mistaken.

Especially when the measured present position is deviated to a direction along the running direction of the vehicle, deviation is caused between the running track and the road shape when the vehicle passes the inflection point. At this time, the errors are caused in the similarity degrees with respect to each correcting candidate point hl through hN. When the change of shape of the road is small at this time, the difference in similarity degree among each correcting candidate point hl through hN is small, so that the difference in similarity degree can not often be distinguished from the difference caused due to the errors of the measured present position p1 and the road data. When the similarity degree is accumulated, the difference of the accumulation similarity degree among the respective correcting candidate points h1 through hN each time the vehicle passes the inflection points. Thus, the best correcting position can be set.

At step c11, 1 is added into the counter n for renewing on the assumption that the calculation and the judgment of the accumulation similarity degree $\Sigma En$ with respect to the correcting candidate point hn is completed. When the renewing of the counter n is completed, step c11 returns to step c5 to effect the calculating and judging operations of the accumulation similarity degree $\Sigma E$ (n+1) with respect to the correcting candidate point h (n+1) continuously. The calculating and judging operations of the accumulation similarity degree En with respect to each correcting candidate point hn are repeated by N times in this manner.

When the value of the counter n becomes more than the value of a variable N at step c5, it is judged that the calculation correction and the judgment operation of the accumulation similarity degree E with respect to all the correcting candidate points hi through hN has been completed. When the operation is completed, it is judged that the correcting candidate point h to be corrected in the present position has been decided. The navigation is carried out with the use of the correcting candidate point. As the navigation, the peripheral road data including the present position of the vehicle is visually displayed on the visual display region of the displaying apparatus 106. For example, the predetermined characters or the like are displayed in a position corresponding to the correcting candidate point decided on the road data to present the present position of the vehicle for the users of the apparatus 101.

When the calculation with respect to all the correcting candidate points hi through hN is completed, step c11 advances to step c11A and 0 is substituted into the counter n for resetting. When the counter n is reset, step c11A advances to step c12. At step c12, it is judged whether or not the value of the counter n is smaller than the variable N. When it is small, the step advances to step c13. At step c13, it is judged whether or not the value of the difference between the accumulation similarity degree $\Sigma En$ and the maximum accumulation $\Sigma Emax$ of the correcting candidate point hn is the predetermined difference DE or more.

$$(\Sigma Emax - \Sigma En)^3 DE \qquad (9)$$

As described above, the accumulation similarity degree is a selection index for selecting the best point to be corrected in the present position of the vehicle among the respective correcting candidate points h1 through hN. The similarity degree E becomes smaller as these correcting candidate points h1 through hN are deviated more from the actual position with the larger influences of the deviation in the running distance. The increase factor in the accumulation similarity degree is reduced and it is considered that the value becomes smaller as compared with the accumulation similarity degree of the best correcting candidate point. Accordingly, assume that a value, as the greatest lower limit value, is smaller by a predetermined difference DE from the maximum accumulation $\Sigma Emax$, and the possibility of becoming maximum again in similarity degree is lower, with the correcting candidate point being deviated largely from the actual present position when the accumulation similarity degree $\Sigma En$ is lower than the greatest lower limit value.

When the value of the difference is more than the difference DE, step c13 advances to step c14 to remove the correcting candidate point hn from the correcting object and advances to step c15. Step c13 and step c14 react to the operation as the candidate removing means. For example, the data about the correcting candidate point hn is removed from a memory 27. In the subsequent correcting operation, the new correcting candidate point is not set in accordance with the correcting candidate point hn. When the value of the difference is a difference DE or lower, step c13 advances as it is to step c15.

At step c11, 1 is added into the counter n for renewing on the assumption that the judgment of the accumulation similarity degree $\Sigma En$ of the correcting candidate point hn has been completed. Upon completion of the renewing of the counter n, step c15 returns to step c12 to continuously effect the judgment of the accumulation similarity degree $\Sigma E$ (n+1) of the correcting candidate point h (n+1). The operation of the judgment of the accumulation similarity degree En of each correcting candidate point hn is repeated by n times.

The correcting candidate point hn lower than the predetermined allowable range with the accumulation similarity degree $\Sigma En$ being the reference of the maximum accumulation $\Sigma Emax$ is sequentially removed in this manner. When the correcting candidate points, which fall out of the allowable range, are removed at each time by a plurality of repetiting times of the positional detection operation of the flow chart, the correcting candidate point having the accumulation result higher in possibility as the present position can be retained. The present position of the vehicle can be corrected into a candidate point nearest to the actual position, because the maximum correcting candidate point in the accumulation value is considered nearest to the present position of the actual vehicle.

Also, the similarity degree becomes smaller by the measured errors of the present position and the accuracy errors of the road data. The accumulation results are caused by a reduction portion in the similarity degree caused, by these errors. This is considered a point where the correcting candidate point having the maximum accumulation result of the similarity degree is out of the actual present position. Therefore, it is preferable to set the above described difference DE largely to an extent where the devaluation of the similarity degree due to the errors does not influence.

When the value of the counter n becomes a variable N or more at step c12, it is judged that the removing operation of the accumulation similarity degree $\Sigma E$ has been completed with respect to all the correcting candidate points h1 through hN. When the operation has been completed, step c12 advances to step c16. The present position is corrected into the optimum correcting candidate point h to advance to step c17 to complete the processing operation of the flow chart.

Thus, the measured present position can be corrected into a reliable correcting present position. Also, the errors caused in this direction can be reduced because the correcting candidate point is set in the longitudinal direction which is in a direction along the road bearing of the link connected continuously.

Also, according to the invention, the map matching means sets a plurality of correcting candidate points to evaluate the accumulation results, in parallel, of the similarity degree with respect to each correcting candidate point. When the accumulation results fall out of the predetermined allowable range with the maximum accumulation results as a reference, the correcting candidate point having the accumulation result is removed from the correcting candidate of the present position. The allowable range has an upper limit which is an accumulation result having a maximum similarity degree, and a lower limit which is a value smaller by a predetermined value than the accumulation result having the maximum similarity degree.

The correcting candidate point is caused by plural in passing inflection points. At the next correcting operation which is conducted after the correcting operation with the correcting candidate point being set, it is considered that the present positions are corrected into the respective correcting candidate points set in the previous correcting operation so that it is set with the previous respective correcting candidate points with reference. The similarity degree, in the newest correcting candidate point where the past correcting candidate point has been set as reference, is added to the accumulation result of the past correcting candidate point into the accumulation result in the newest correcting candidate point.

Therefore, when the past correcting candidate point does not agree with the actual correcting candidate point or is not close to the actual correcting candidate point, the correcting candidate point with the candidate point as a reference is reduced in similarity degree in the correcting operation after passing the inflection point of the road. Therefore, when the accumulation result is lower than the greatest lower limit value of the allowable range, it is considered that the past correcting candidate point does not agree with the actual present point. Therefore, the candidate point removing means stops the similarity degree calculation about the correcting candidate point to remove them from the correcting candidate. The correcting candidate points are removed sequentially from the correcting candidates which are larger in the possibility of being deviated from the actual present position in the correcting candidate point. Thus, the best correcting candidate point finally remains. The frequency of the similarity degree calculation in one time of correcting operation can be reduced sequentially, because the plurality of correcting candidate points are sequentially reduced. Therefore, the calculating time in the map matching means is shortened.

Also, the measured present position is removed from the road portion on the road data by the measuring errors and the accuracy errors of the road data, so that the similarity degree sometimes becomes smaller. When the accumulation result of the similarity degree is small in difference, the correcting candidate point having the maximum accumulation result is sometimes replaced. As described above, by moving the correcting candidates sequentially from the correcting candidate point where the possibility of being deviated from the actual present point is extremely large, the correcting candidate point similar in the accumulation result is sometimes judged after the difference of the accumulation result becomes large by many repetition times of the similarity degree calculation.

Therefore, the judgment of the correcting candidate point having best accumulation result can be continued even when the correcting candidate point having the maximum accumulation result is wrong.

Further, the invention is characterized in that the map matching means includes:

road retrieving means for retrieving a road portion near the detected present position from the recorded road data;

candidate point setting means for responding to outputs of the road retrieving means and setting a plurality of correcting candidate points on the road portion;

similarity degree calculation accumulating means for responding to outputs of the candidate point setting means and calculating and accumulating a similarity degree in accordance with a distance between the present position of the vehicle and each correcting candidate point, and with a bearing difference between a road bearing of the road portion to which the candidate point belongs and a progress bearing of the vehicle; and candidate point removing means for responding to outputs of the similarity degree calculation accumulating means, comparing accumulation results of the similarity degrees of the respective correcting candidate points, and removing, from the subsequent similarity degree calculation a correcting candidate point having another, a small accumulation result which is beyond an allowable range which is predetermined using a maximum accumulation result among the accumulation results of the respective connecting candidate points as a reference.

According to the invention, the map matching means sets a plurality of correcting candidate points in passing the inflection points of the road to evaluate in parallel the similarity degree with respect to the respective correcting candidate points.

At first, the road retrieving means retrieves the road portions which are in a position near the detected present position of the vehicle in accordance with the road data read out from the road data recording means. The retrieved road portion is regarded as the road of the correcting candidate to be corrected in the measured present position. The road retrieving means retrieves a plurality of road portions which are positioned within the predetermined region around the present position for regarding all these road portions as correcting candidates.

When the road portions of the correcting candidates are retrieved, the candidate point setting means sets the correcting candidate point to be corrected in the present position on the retrieved road portions. The correcting candidate point is set by plural in the direction along the running direction of the vehicle. These correcting candidate points are respectively set on each road portion of the plurality of continuous road portions connected with the end portions. Also, they may be set on the same road portion.

When the correcting candidate point is set, the similarity degree calculation accumulating means calculates the similarity degree individually with respect to each correcting candidate point for accumulating each correcting candidate point. The similarity degree is a judging index where the similarity between the running history and the road shape is made numerical in size. The similarity becomes higher as the value becomes larger. The similarity degree is calculated in accordance with the road bearing of the road portion, the present position of the vehicle and the progress bearing.

When the correcting candidate point is produced by plural in passing the inflection points, the present position is regarded as being corrected into these correcting candidate points previously at the next present position and the progress bearing detection to set with the previous respective correcting candidate point as a reference. The similarity degree calculation accumulating means accumulates the similarity degrees of the correcting candidate points which are successively set and evaluated on the basis of the plurality of correcting candidate points produced in a certain point.

The accumulation result of the similarity degree is given to the candidate point removing means and is used as the judging index for selecting the best correcting candidate point. For example, the accumulation results of the similarity degree of a plurality of road portions are compared with for judgment to select the maximum value of the accumulation result as a maximum as the best correcting candidate point. At this time, the allowable range of the accumulation result is decided with the maximum accumulation result as a reference. The allowable range is the value of the largest accumulation result in the upper limit value and is a value reduced by the predetermined value from the value of the maximum accumulation result in the greatest lower limit value.

The correcting candidate point removing means judges whether or not the value of the accumulation result of each correcting candidate point is included in the allowable range. The correcting candidate point which has fallen out of the allowable range in the accumulation result is regarded as being largely deviated from the present position of the actual vehicle. Therefore, the correcting candidate point removing means stops the similarity degree calculation about the correcting candidate point. Namely, in the measuring time after the next time, the next correcting candidate point is set with the correcting candidate point as a reference, and an operation for calculating the similarity degree is not effected.

As described above, the map matching means sets a plurality of correcting candidate points to have regarded the present position as corrected into these correcting candidate points to effect the similarity degree calculation in parallel with respect to each correction candidate point. These correcting candidate points become smaller in similarity degree as the variation becomes larger from the actual present point with influences of the deviation of the running distance being larger. Therefore, the increase ratio of the accumulation result of the similarity degree is lowered and the value becomes smaller as compared with the accumulation result of the similarity degree of the best correcting candidate point. Accordingly, when the value of the accumulation result becomes lower from the predetermined greatest lower limit value from the accumulation result with respect to the best correcting candidate point, the correcting candidate point is deviated larger from the actual present position so that the possibility of increasing the similarity degree again is considered lower.

Finally, the correcting candidate point having the maximum accumulation result finally can remain by a gradual removing of the correcting candidate point lower than the predetermined allowable range with the maximum accumulation result in the value of the accumulation result as reference. The best correcting candidate point can be selected.

Also, the similarity degree also becomes smaller by the measure errors of the present position and the accuracy errors of the road data. The accumulation result becomes inaccurate by the reduction portion of the similarity degree caused by these errors and is considered a point where the correcting candidate point having the maximum accumulation result of the similarity degree is deviated from the actual present position. Therefore, it is preferable to set the above described allowable range to be largely to an extent where the deviation of the similarity due to the errors does not provide an influence.

Further, according to the invention, the above described correcting candidate position is set on the road portion corrected in the past present position and the road portion connected with the road portion. These correcting candidate points show the values which are used for obtaining the similarity degree and have similar values in parameters, and are set in a position where the similarity degree is estimated to become almost equal. They are road portions for satisfying such conditions, for example, inflection points of the road. In the apparatus of the conventional art, the correcting candidate points are set only in passing the branch points of the road. But in the apparatus of invention, it is not necessary for the road to be branched. A plurality of correcting candidate points can be set even when the vehicle runs on a road such as an expressway or the like where branching is extremely limited.

Also, the correcting candidate point is set on a plurality of road portions for forming a single road. A point for satisfying the above described conditions on such a road is set side by side in a direction along the progress direction of the vehicle. The deviation of the position of the correcting candidate points is caused due to errors in the along direction, such as measuring errors of the running distance. Although it is difficult to reduce the errors of the along direction in the apparatus of the conventional art, it is easier to reduce the errors in the apparatus of the invention.

Further the invention is characterized in that the correction candidate point setting means sets correction candidate points on road portions among a plurality of road portions retrieved by the road retrieving means, the road portions including road portions corrected in the past present position and a plurality of road portions which are connected to the road portions corrected in the past present position, road portions whose bearing differences from measured progress bearings are within a predetermined range of bearing difference, and road portions whose distances from the measured present position are within a predetermined range of distance.

According to the invention, the candidate point setting means sets a plurality of correcting candidate points on the road portion connected with the road portion corrected in the past present position and with the road portion, among the road portions of the correcting candidate points, retrieved by the road retrieving means. The correcting candidate point is set so that at least one of the bearing difference between the road bearing of the road portion and the progress bearing measured, and the distance between the road position and the measured present portion is included within the predetermined range. Namely, the parameters which are used for obtaining the similarity degree show the value of the similarity, and are set in an estimated position when the similarity degree becomes an almost equal value.

Suppose that the vehicle deviated from the actual running distance and the measured running distance passes the inflection points. At this time, the distance between the present position and the road portion before the inflection points is sometimes smaller than the distance with respect to the road portion after the inflection points although the bearing difference between the progress bearing of the vehicle and the road bearing of the road portion before the inflection points is larger than the bearing difference with respect to the road portion after the inflection points. At this time, by obtaining the similarity degree with the respect to the road portion before the inflection points and after the inflection points, the value is sometimes almost equal.

The correcting candidate points are set for each of a plurality of road portions connected to each other, which form a single road, and are expected to have an equal similarity value in calculation of similarity degree. The correcting candidate point is set on the upstream side and the downstream side along the vehicle progress direction with the inflection points being grasped. The deviation between two correcting candidate points, which deviation is caused along the progress direction is considered to be caused due to measuring errors of the present position and the progress bearing and the accuracy errors, and either of the correcting candidate points is considered to correspond to the present position of the actual vehicle.

When a point on the road portion, where the value of the similarity degree is expected to be almost equal, exists by plural on a plurality of road portions for forming the single road, all the points are set as correcting candidate points. When either of the correcting candidate points is selected by the above described method, the correcting candidate point corresponding to the present position of the actual vehicle is considered to be obtained.

In the navigation apparatus of the conventional art, the correcting candidate point for effecting parallel evaluation of the road was produced only when the vehicle passed the branch point of the road. The correcting candidate point for satisfying the above described conditions are considered to be caused each time the vehicle not only passes the branch point of the road, but also passes the inflection points of the road. Therefore, the deviation of the present position can be reduced even on the road such as an expressway or the like where the branching of the road is extremely minimal.

Further, the invention is characterized in that the present position detecting means includes:

first position detecting means for detecting a first present position;

second position detecting means for detecting a second present position with the use of a method different from the first position detecting means; and the correcting candidate point setting means responds to outputs of the first and second position detecting means and sets points to be corrected with respect to the first and second present positions onto road portions retrieved by the road retrieving means, as correcting candidate points.

According to the invention, the present position detecting means has first and second position detecting means different in the detecting method of the present position. The first position detecting means is means for detecting the absolute position coordinates of the present position of the vehicle as in, for example, the GPS. In the detecting means, it is preferable not to effect the relative positional detection with the use of the running distance, the progress bearing, and so on of the vehicle.

The second position detecting means detects the present position in accordance with, for example, the running distance and the progress bearing of the vehicle.

The correcting candidate point producing means obtains the first and second present positions detected by the respective detecting means from the first and second position detecting means. The correcting candidate positions are produced in accordance with the first and second present positions. For example, the points for correcting the first and second present positions are respectively set on the road portion retrieved by, for example, the road retrieving means, with the points as correcting candidate points.

In this manner, the points to be corrected in two present positions are respectively made the correcting candidate points when the present positions detected by two position detecting means are different. The difference between the first present position which is the absolute position, and the second present position which is the relative position is regarded as corresponding to the deviation between the measured running distance and the actual running distance. Therefore, the errors of the running distance can be reduced when these correcting candidate points are judged with the use of the above described method.

Also, the correcting candidate points can be set despite the existence of the inflection points of the road on which the vehicle runs because the correcting candidate points are set in accordance with the detected present position in this manner. Therefore, the errors can be reduced even on roads such as expressway roads or the like, where the vehicle often travels straight.

Also, in the detecting means for detecting the absolute positional coordinates such as a GPS and so on, it is often the case that they cannot be used all the time although the present position is measured independent of the measured running distance of the vehicle. For example, the GPS can effect the positional measuring operation no more when signals from the positioning satellites are received, because, for example, the GPS effects triangular surveying with the use of the positional satellites. But the correcting candidate points are not required to detect the positional coordinates continuously. Therefore, it is enough to measure the present position only when the position measuring operation can be effected, and set the correcting candidate points.

Also, according to the invention, a plurality of correcting candidate points are set as points for correcting the first and second present positions measured by the different method. For example, measure the first present position with the use of the GPS to obtain the second present position relatively from the turning amount and running distance of the vehicle. At this time, the difference between the first present position and the second present position corresponds to the deviation between the measured running distance and the actual running distance. Therefore, when these correcting candidate points are judged with the use of the above described method, the errors of the running distance can be reduced. These correcting candidate points can be set despite the existence of the inflection points of the road. Therefore, the errors in a direction along the running direction can be reduced even on roads such as an expressway, and so on, where the vehicle very often has to travel straight.

What is claimed is:

1. A vehicle position detecting apparatus comprising:

road data recording means for recording road data composed of linear road portions;

reading means for reading out the recorded road data from said road data recording means;

present position detecting means for detecting a present position of a vehicle;

vehicle bearing detecting means for detecting a progress bearing corresponding to a progress direction of the vehicle at the present position; and map matching means for receiving outputs of said reading means, said present position detecting means, and said vehicle bearing detecting means, wherein said map matching means comprises:

degree of similarity calculating means for retrieving linear road portions from the recorded road data which are close to the detected present position of the vehicle, and calculating a degree of similarity value for each of the retrieved linear road portions on the basis of the present position and the progress direction of the vehicle, wherein the degree of similarity value reflects a degree of similarity between a bearing of the retrieved linear road portion and a running history of the vehicle; and position correcting means comprising:

degree of similarity judgement means for receiving an output of said degree of similarity calculating means and for judging whether the degree of similarity value calculated for each of the retrieved linear road portions is larger than a predetermined value; and section measurement means for receiving an output of said degree of similarity judgement means and measuring either a distance traveled by the vehicle or a time period which is passed during a period the degree of similarity value for a single retrieved linear road portion is continuously judged to be larger than the predetermined value;

said position correcting means corrects the present position of the vehicle on the single retrieved linear road portion when either the measured distance is greater than a predetermined distance or the measured time period is greater than a predetermined time period.

2. A vehicle position detecting apparatus as claimed in claim 1, wherein said section measurement means accumulates into a accumulative result a length of a section which is passed from an immediately preceding judgement to the current judgement when the degree of similarity value is equal to or larger than the predetermined value, and subtracts the length from the accumulative result when the degree of similarity value is smaller than the predetermined value.

3. A vehicle position detecting apparatus comprising:
road data recording means for recording road data composed of linear road portions;
reading means for reading out the recorded road data from said road data recording means;
present position detecting means for detecting a present position of the vehicle;
vehicle bearing detecting means for detecting a progress bearing corresponding to a progress direction of the vehicle at the present position; and
map matching means for receiving outputs of said reading means, said present position detecting means, and said vehicle bearing detecting means, wherein said map matching means comprises:
road retrieving means for retrieving linear road portions from the recorded road data which are connected with an end portion of a linear road portion to which a past present position of the vehicle belongs;
road distinguishing means for receiving an output of said road retrieving means and distinguishing the retrieved linear road portions into upstream side road portions which have a direction that is reverse to the progress direction of the vehicle and into downstream side road portions which have a same direction as the progress direction of the vehicle;
degree of similarity calculating means for receiving an output of said road retrieving means and calculating a degree of similarity value for each of retrieved road portions on the basis of the present position and the progress direction of the vehicle, wherein the degree of similarity value reflects a degree of similarity between a bearing of the retrieved linear road portion and a running history of the vehicle;
degree of similarity reducing means for receiving an output of said road distinguishing means and said degree of similarity calculating means, and reducing the degree of similarity value for each of the upstream side road portions; and
position correcting means for receiving an output of said degree of similarity reducing means and correcting the present position of the vehicle on a correcting candidate point of one of the retrieved linear road portions which has a largest degree of similarity value.

4. A vehicle position detecting apparatus as claimed in claim 3, wherein said road distinguishing means distinguishes the retrieved linear road portions which are connected with both ends of the linear road portion to which a past corrected present position of the vehicle belongs, into upstream side road portions composed of linear road portions which are connected with an end on the upstream side in the progress direction of the vehicle, and into downstream side road portions composed of linear road portions which are connected with an end of the downstream side in the progress direction of the vehicle.

5. A vehicle position detecting apparatus comprising:
road data recording means for recording road data composed of linear road portions;
reading means for reading out the recorded road data from said road data recording means;
present position detecting means for detecting a present position of a vehicle;
vehicle bearing detecting means for detecting a progress bearing corresponding to a progress direction of the vehicle at the present position; and
map matching means for receiving outputs of said reading means, said present position detecting means, and said vehicle bearing detecting means, wherein said map matching means comprises:
road retrieving means for retrieving linear road portions from the recorded road data which are near the detected present position of the vehicle;
correcting candidate point setting means for receiving outputs of said road retrieving means and setting correcting candidate points on the retrieved linear road portions in a predetermined manner; and
degree of similarity calculation accumulating means for receiving outputs of said correcting candidate point setting means, calculating a degree of similarity value for each of the correcting candidate points on the basis of a distance between the present position of the vehicle and each of the correcting candidate points and on the basis of a bearing difference between the bearing of each of the retrieved linear road portions to which each of the correcting candidate point belongs and a progress bearing of the vehicle, wherein the degree of similarity value indicates a degree of similarity between the retrieved linear road portions to which each of the correcting candidate points belong and a running history of the vehicle, and accumulating degree of similarity values obtained from past corrected present positions of each of the correcting candidate points with the current degree of similarity value calculated for each of the correcting candidate points, respectively;
wherein a correcting candidate point having a largest accumulated degree of similarity value is considered the present position of the vehicle.

6. A vehicle position detecting apparatus as claimed in claim 5, wherein said map matching means further comprises:
correcting candidate point removing means for receiving outputs of said degree of similarity calculation accumulating means, comparing the accumulation results of the degree of similarity values of the respective correcting candidate points, and removing, from a subsequent degree of similarity value calculation, a correcting candidate point having an accumulation result which is beyond an allowable range which is predetermined using a maximum accumulation result among the accumulation results of the respective correcting candidate points as a reference.

7. A vehicle position detecting apparatus as claimed in claim 5, wherein said correcting candidate point setting means sets the correcting candidate points on linear roads portions, among the plurality of linear road portions retrieved by said road retrieving means, which include linear road portions corrected in a past present position and linear road portions which are connected to the linear road portions corrected in the past present position, linear road portions whose bearing differences from the measured progress bearings are within a predetermined range of bearing difference, and linear road portions whose distances from the measured present position are within a predetermined range of distance.

8. A vehicle position detecting apparatus as claimed in claim 7, wherein said present position detecting means comprises:

first position detecting means for detecting a first present position; and second position detecting means for detecting a second present position using a method different from said first position detecting means; and wherein said correcting candidate point setting means receives outputs of said first and second position detecting means and sets points to be corrected with respect to the first and second present positions onto linear road portions retrieved by said road retrieving means as the correcting candidate points.

\* \* \* \* \*